(12) United States Patent
Kiyoshige

(10) Patent No.: US 8,581,960 B2
(45) Date of Patent: Nov. 12, 2013

(54) IMAGING DEVICE, IMAGING METHOD, AND IMAGING SYSTEM

(75) Inventor: Ryuichi Kiyoshige, Yokohama (JP)

(73) Assignee: Olympus Corporation, Tokyo (JP)

( * ) Notice: Subject to any disclaimer, the term of this patent is extended or adjusted under 35 U.S.C. 154(b) by 365 days.

(21) Appl. No.: 12/895,164

(22) Filed: Sep. 30, 2010

(65) Prior Publication Data

US 2011/0096142 A1 Apr. 28, 2011

(30) Foreign Application Priority Data

Oct. 22, 2009 (JP) ................................. 2009-243290

(51) Int. Cl.
*H04N 7/00* (2011.01)
(52) U.S. Cl.
USPC .................... 348/36; 348/47; 348/46; 348/42
(58) Field of Classification Search
USPC ......................................... 348/36, 47, 46, 42
See application file for complete search history.

(56) References Cited

U.S. PATENT DOCUMENTS 6,639,625 B1 * 10/2003 Ishida et al. ............... 348/218.1
8,391,641 B2 * 3/2013 Porter ........................... 382/284

FOREIGN PATENT DOCUMENTS

| JP | 06-035038 A | | 2/1994 |
|---|---|---|---|
| JP | 2003-158664 A | | 5/2003 |
| JP | 2009-094724 | * | 4/2009 |
| JP | 2009-094724 A | | 4/2009 |

OTHER PUBLICATIONS

Notice of Allowance mailed Sep. 3, 2013 in corresponding Japanese Patent Application No. 2009-243290. English Translation (6 pages).

* cited by examiner

*Primary Examiner* — Shawn An
(74) *Attorney, Agent, or Firm* — Westerman, Hattori, Daniels & Adrian, LLP

(57) ABSTRACT

The present invention is an imaging apparatus including: a receiving unit that receives information representing a first focal length from a terminal which produces an image of a first imaging area by capturing an image of a subject at the first focal length; an imaging unit that produces an image of a second imaging area by capturing an image of the subject at a second focal length; an extraction unit that extracts a characteristic area of the subject from the image of the second imaging area based on information representing the first focal length and information representing the second focal length; and a transmitting unit that transmits information regarding the image of the characteristic area to the terminal.

12 Claims, 18 Drawing Sheets

IMAGING DEVICE, IMAGING METHOD, AND IMAGING SYSTEM

BACKGROUND OF THE INVENTION

1. Field of the Invention

The present invention relates to an imaging device, an imaging method, and an imaging system for capturing images of the same object from different positions by combining a plurality of imaging devices in order to use 3-D imaging or the like.

Priority is claimed on Japanese Patent Application No. 2009-243290, filed Oct. 22, 2009, the content of which is incorporated herein by reference.

2. Description of Related Art

There is a function of simultaneously executing a shot instruction to a plurality of cameras through remote controlling. Using this function, a synchronized shot can be performed using a plurality of cameras in various applications such as a panorama image or a 3-D image. In this case, a photographer adjusts framing one by one for a plurality of cameras to make a shot. A method of addressing such cumbersomeness while capturing an image is disclosed in Japanese Unexamined Patent Application Publication No. 2009-94724.

According to Japanese Unexamined Patent Application Publication No. 2009-94724, there is provided an imaging apparatus capable of obtaining the merits of both an integrated type compound eye camera and a separation type compound eye camera and of easily determining a composition when capturing images. Specifically, the main camera measures the counterpart position by transmitting a relative positional detection signal from the main camera to the subsidiary camera and transmitting a receiving time of the relative positional detection signal from the subsidiary camera to the main camera. In addition, in order to match framing between the main camera and the subsidiary camera, a movement direction computation means and a movement direction display means are provided.

SUMMARY OF THE INVENTION

The present invention proposes the following means. A first imaging apparatus according to the present invention includes: a receiving unit that receives information representing a first focal length from a terminal which produces an image of a first imaging area by capturing an image of a subject at the first focal length; an imaging unit that produces an image of a second imaging area by capturing an image of the subject at a second focal length; an extraction unit that extracts a characteristic area of the subject from the image of the second imaging area based on information representing the first focal length and information representing the second focal length; and a transmitting unit that transmits information regarding the image of the characteristic area to the terminal.

In the first imaging apparatus, the extraction unit may further extract characteristics of the subject from an image of the characteristic area, and the information regarding the image of the characteristic area may represent the characteristics of the subject.

In the first imaging apparatus, the transmitting unit may further transmit information representing the second focal length to the terminal.

A second imaging apparatus according to the present invention includes: a receiving unit that receives information representing the second focal length and information regarding an image of a characteristic area of a subject extracted from an image of a second imaging area from a terminal which produces the image of a second imaging area by capturing an image of the subject at a second focal length; an imaging unit that produces an image of a first imaging area by capturing an image of the subject at a first focal length; an area determination unit that determines a detection target area for detecting an image of the first imaging area corresponding to an image of the characteristic area based on information regarding the image of the characteristic area, information representing the first focal length, and information representing the second focal length; a detection unit that detects an image of the first imaging area corresponding to the image of the characteristic area based on information regarding the image of the characteristic area and an image of the detection target area within the first imaging area; and a control unit that adjusts focus of the subject based on a result of the detection.

In the second imaging apparatus, the receiving unit may further receive relative relationship information regarding a relative positional relationship between the terminal and the subject when the terminal images the subject at the second focal length and information representing a second imaging posture when the terminal images the subject at a second focal length. And the control unit may further execute framing computation based on the relative relationship information, information representing the second imaging posture, and information representing a first imaging posture when the imaging apparatus images the subject at the first focal length.

The second imaging apparatus may further include an adjustment unit that adjusts the first imaging posture based on a result of the framing computation.

The second imaging apparatus may further include a display unit that displays a result of the framing computation.

In the second imaging apparatus, the control unit may execute framing computation for capturing an image used together with an image obtained from the terminal by imaging the subject when a 3-D image or a panorama image of the subject is produced.

The second imaging apparatus may further include a transmitting unit that transmits the information representing the first focal length to the terminal.

A first imaging method according to the present invention includes the steps of: receiving information representing a first focal length of a subject from a terminal which produces an image of a first imaging area by capturing an image of the subject at the first focal length; producing an image of a second imaging area by capturing an image of the subject at a second focal length and extracting a characteristic area of the subject from an image of the second imaging area based on information representing the first focal length and information representing the second focal length; and transmitting information regarding the image of the characteristic area to the terminal.

A second imaging method according to the present invention includes the steps of: receiving information representing a second focal length and information regarding an image of a characteristic area of a subject extracted from an image of a second imaging area from a terminal which produces an image of the second imaging area by capturing an image of the subject at the second focal length; producing an image of a imaging area by capturing an image of the subject at a first focal length; determining a detection target area for detecting the image of the first imaging area corresponding to the image of the characteristic area based on the information regarding the image of the characteristic area, information representing the first focal length, and information representing the second focal length; detecting the image of the first imaging area corresponding to the image of the characteristic area based on information regarding the image of the characteristic area and an image of the detection target area within the first imaging area; and adjusting focus of the subject based on a result of the detection.

An imaging system according to the present invention includes a first imaging apparatus that produces an image of a first imaging area by capturing an image of a subject at a first focal length and a second imaging apparatus that produces an image of a second imaging area by capturing an image of the subject at a second focal length. The first imaging apparatus includes: a first receiving unit that receives information regarding an image of a characteristic area of the subject extracted from the image of the second imaging area and information representing the second focal length from the second imaging apparatus; a first imaging unit that produces the image of the first imaging area by capturing an image of the subject at the first focal length; a first transmitting unit that transmits information representing the first focal length to the second imaging apparatus; an area determination unit that determines a detection target area for detecting an image of the first imaging area corresponding to the image of the characteristic area based on information regarding the image of the characteristic area, information representing the first focal length, and information representing the second focal length; a detection unit that detects an image of the first imaging area corresponding to the image of the characteristic area based on information regarding the image of the characteristic area and an image of the detection target area within the first imaging area; and a control unit that adjusts focus of the subject based on a result of the detection. In addition, the second imaging apparatus includes: a second receiving unit that receives information representing the first focal length from the first imaging apparatus; a second imaging unit that produces an image of the second imaging area by capturing an image of the subject at the second focal length; an extraction unit that extracts the characteristic area of the subject from the image of the second imaging area based on information representing the first focal length and information representing the second focal length; and a second transmitting unit that transmits information regarding the image of the characteristic area and information representing the second focal length to the first imaging apparatus.

DETAILED DESCRIPTION OF THE INVENTION

Figure 1:
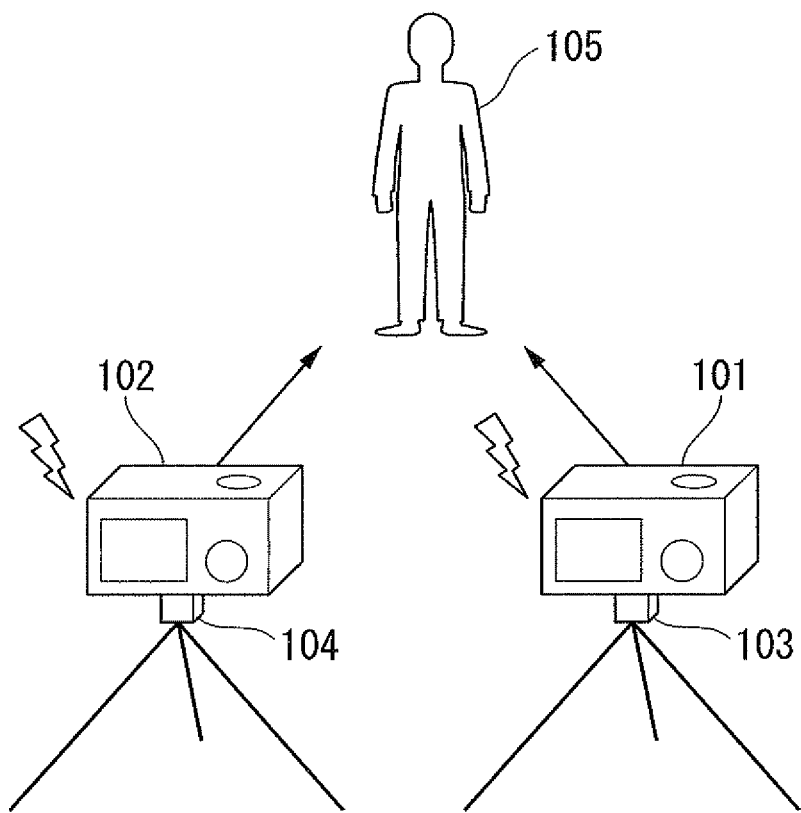
FIG. 1 is a schematic diagram illustrating a configuration of an imaging system according to an embodiment of the present invention.

Hereinafter, embodiments of the present invention will be described with reference to the accompanying drawings. FIG. 1 illustrates a configuration of an imaging system according to an embodiment of the present invention. As shown in FIG.

1, there are two cameras, camera 101 and camera 102, and these cameras simultaneously image the same subject 105. In the present embodiment, while a case where two cameras are used is described, three or more cameras may be used.

The cameras 101 and 102 have a communication capability and while communicating posture information or positional information with each other using such a communication capability, compute a relative position with respect to the counterpart camera based on such information. As a result, the cameras 101 and 102 obtain relative positional relationship information representing a relative positional relationship with respect to each other. The posture information represents postures of the cameras 101 and 102 determined based on the orientation and the rotation amount (angle) around each of the X, Y, and Z axes. The positional information represents positions of the cameras 101 and 102 with respect to the reference position. The relative positional relationship information contains information representing a relative distance between the cameras 101 and 102 on the X-Y plane and a height difference between the cameras 101 and 102 in the Z-axis direction.

The roles of the main camera and the subsidiary camera are determined at the timing when either of the cameras 101 or 102 executes the manipulation for imaging. When a user executes the manipulation of imaging using the camera 101, the camera 101 takes a role of the main camera, and the camera 102 takes a role of the subsidiary camera. A role of the main camera is to notify the subsidiary camera of the instructions regarding imaging, framing, or focusing. On the other hand, a role of the subsidiary camera is to execute framing, focusing, or imaging in response to the aforementioned notification from the main camera. Hereinafter, it is assumed that the camera 101 takes a role of the main camera, and the camera 102 takes a role of the subsidiary camera.

In addition, as shown in FIG. 1, in the case where each camera is installed in the camera platforms 103 and 104, each camera notifies the camera platforms 103 and 104 of the operational signals. Here, the camera platforms 103 and 104 are electronic type camera platforms and are operated in response to the operational signal. The present invention is not related to the operation of the camera platform, and thus, further description of the camera platform will not be made.

The camera 102 obtains various kinds of information from the camera 101 and recognizes postures and a relative positional relationship between the two cameras to compute a movement amount (adjustment amount) required to execute framing in the camera 102. The adjustment amount is displayed on the display unit of the camera 102, and a user adjusts the posture of the camera 102 by manual manipulation. Alternatively, the camera platform 104 is notified of the adjustment amount and automatically adjusts the posture of the camera 102. As a result, the cameras 101 and 102 are capable of executing framing so as to be directed toward the same subject 105.

In addition, the camera 101 extracts characteristics of the image from the characteristic extraction area of the image captured by the camera 101 and transmits the characteristic data representing the characteristics thereof to the camera 102. The camera 102 receives the characteristic data from the camera 101, extracts the area corresponding to the characteristic extraction area of the image captured by the camera 101 from the image captured by the camera 102, moves a focus point to that area, and executes focus adjustment. The characteristic extraction area includes the focus point of the camera 101. In addition, the area corresponding to the characteristic extraction area is an area which includes the characteristic similar to the characteristic indicated by the characteristic data in the image captured by the camera 102. Therefore, when the camera 102 moves the focus point to the area corresponding to the characteristic extraction area and execute focus adjustment, it is possible to focus the cameras 101 and 102 on the same subject 105.

Figure 2:
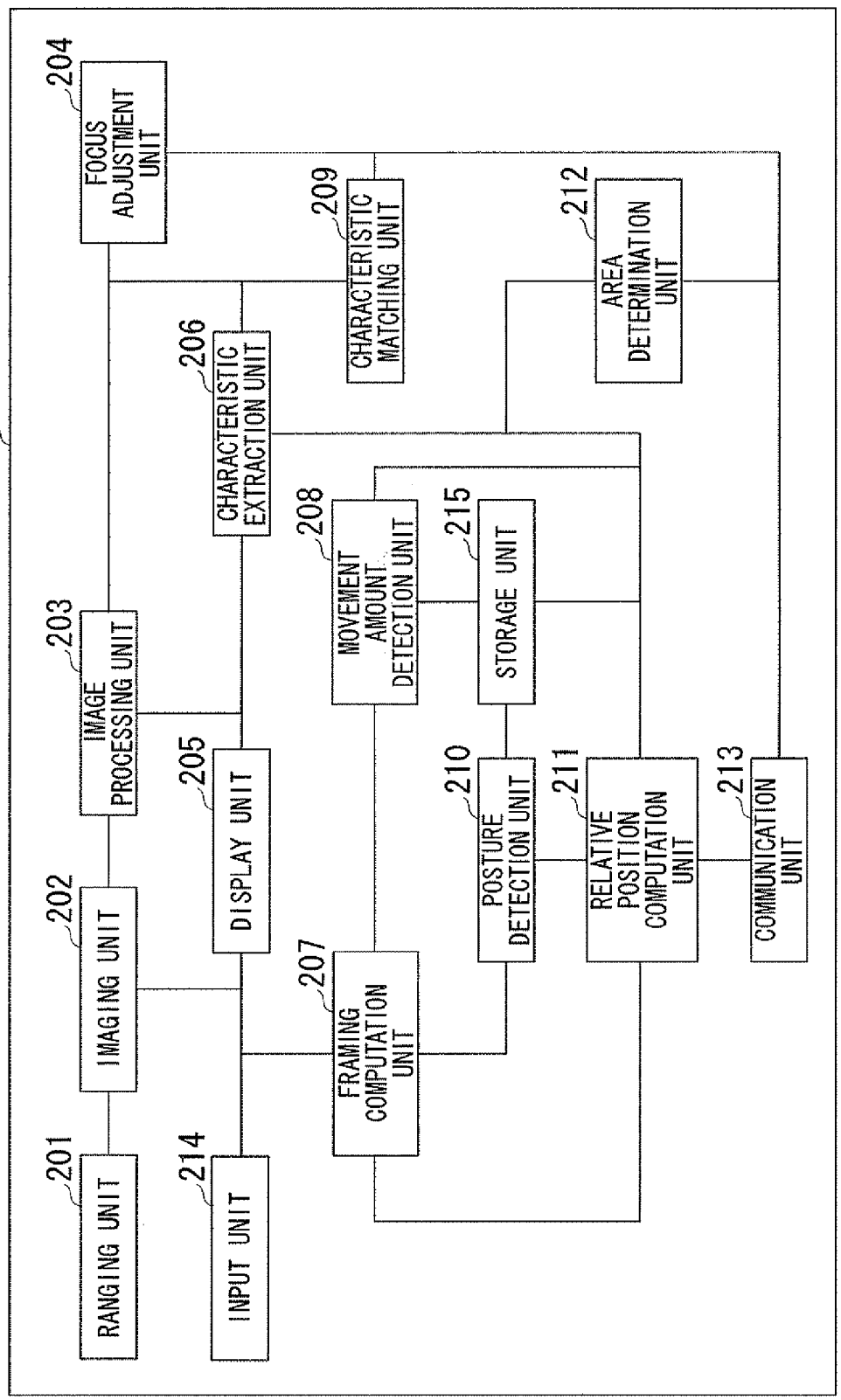
FIG. 2 is a block diagram illustrating a configuration of a camera according to an embodiment of the present invention.

FIG. 2 illustrates the functions and the configuration of the camera 101. The cameras 101 and 102 have the same functions and configuration.

Each of the camera 101 and 102 includes a ranging unit 201, an imaging unit 202, an image processing unit 203, a focus adjustment unit 204, a display unit 205, a characteristic extraction unit 206, a framing computation unit 207, a movement amount detection unit 208, a characteristic matching unit 209, a posture detection unit 210, a relative position computation unit 211, an area determination unit 212, a communication unit 213, an input unit 214, and a storage unit 215.

The ranging unit 201 measures a distance from the subject. The imaging unit 202 images the subject and produces image data corresponding to the subject image formed on the imaging area. The image processing unit 203 processes the image data obtained by the imaging unit 202. The focus adjustment unit 204 drives lenses depending on the distance from the subject obtained from the ranging unit 201 and focuses on the subject. Alternatively, the focus adjustment unit 204 drives the lenses to focally concentrate on the area obtained by the characteristic matching unit 209 and focuses on the subject.

The display unit 205 has a finder and displays the photograph on the finder such that a user can recognize the photograph resulting from a user capturing an image. In addition, the display unit 205 displays a framing instruction or a focus position on the finder for a user based on the information obtained using the framing computation unit 207 to prompt manipulation by a user. The characteristic extraction unit 206 extracts the characteristics of the image from the image data corresponding to the characteristic extraction area determined by the area determination unit 212. The size of the characteristic extraction area changes depending on the focal length of the camera 101 or 102.

The framing computation unit 207 computes the movement amount necessary for framing (adjustment amount around each of the X-axis, Y-axis, and Z-axis) based on the relative positional relationship information and the posture information obtained from the relative position computation unit 211. The movement amount detection unit 208 measures the movement amount of itself from the reference position using an acceleration sensor or the like. The characteristic matching unit 209 extracts the area similar to the characteristics represented by the characteristic data from the image data processed by the image processing unit 203 using the characteristic data received from the other camera (in the following example, the camera 101) through the communication unit 213.

The posture detection unit 210 measures a direction (orientation) of itself or inclination information in a tri-axial direction using an azimuth sensor, a tri-axial sensor, or the like. The relative position computation unit 211 computes a relative positional relationship between itself and the other camera. Such a relative positional relationship is computed based on the posture information of itself and the movement amount from the reference position and the posture information of the other camera notified through the communication unit 213. The area determination unit 212 determines the characteristic extraction area (characteristic area) for producing characteristic data. The camera 101 determines the characteristic extraction area (characteristic area) based on the focal length information of the camera 101 and the focal length information notified from the other camera (in the following example, the camera 102) obtained through the communication unit 213. In addition, the area determination unit 212 determines the area (detection target area) which is a target of the processing for detecting the area having the characteristic indicated by the characteristic data from the image data processed by the image processing unit 203. The camera 102 determines the area (detection target area) which is a target of the processing for detecting the area having the characteristic indicated by the characteristic data from the image data processed by the image processing unit 203 based on the focal length information notified from the other camera (in the following example, the camera 101) obtained through the communication unit 213 and the focal length information of the camera 102.

The communication unit 213 transmits and/or receives the movement amount, the posture information, the focal length information, and the characteristic data, for example, through a short-distance wireless communication with other cameras. The input unit 214 has a release button or the like to receive a user's manipulation such as image capturing. The storage unit 215 stores the image data, the characteristic data, the movement amount of the camera, the relative positional relationship information, the posture information, and the like.

(Exemplary Method of Obtaining Relative Positional Relationship)

Next, a description will be made for a method of obtaining the relative positional relationship between the cameras 101 and 102. As described above, the relative positional relationship includes a relative distance on the X-Y plane between the cameras 101 and 102 and a height difference in the Z-axis direction between the cameras 101 and 102. First, a description will be made for a method of obtaining a relative distance between the cameras.

(First Example of Method of Obtaining Relative Distance)

Figure 3A:
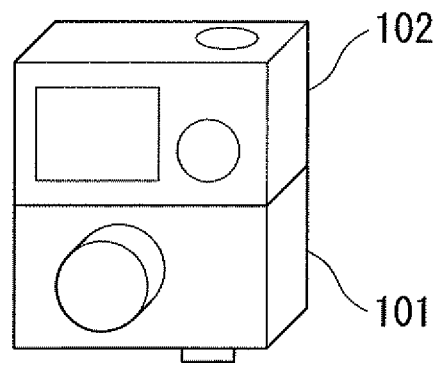
FIG. 3A is a reference diagram showing a method of obtaining a relative position relationship using a camera according to an embodiment of the present invention.
Figure 3B:
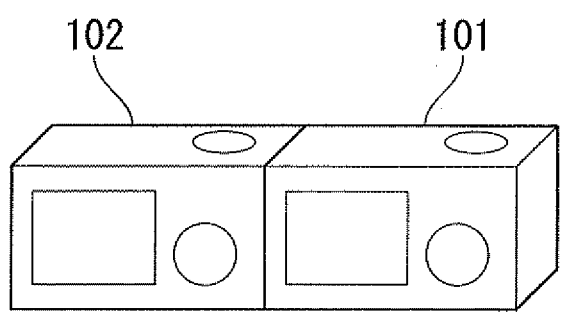
FIG. 3B is a reference diagram showing a method of obtaining a relative position relationship using a camera according to an embodiment of the present invention.
Figure 3C:
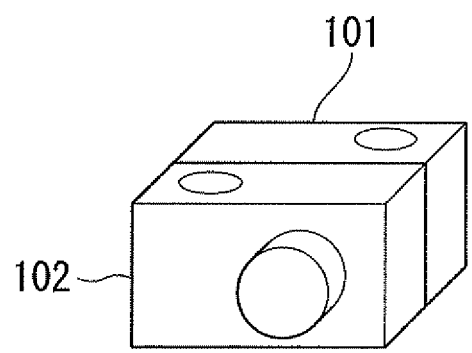
FIG. 3C is a reference diagram showing a method of obtaining a relative position relationship using a camera according to an embodiment of the present invention.

Hereinafter, a first example of a method of obtaining the relative distance will be described. FIGS. 3A to 3C illustrate a method of determining a reference position as a pre-process for obtaining the relative distance between the cameras. In addition, the body surfaces of the cameras 101 and 102 are provided with a portion capable of connecting with other cameras. When the cameras are overlapped with each other such that these portions are overlapped, the cameras are located in the reference position, and the relative distance is zero.

FIGS. 3A to 3C illustrate a state that the cameras are overlapped with each other. FIG. 3A illustrates a state that the lower faces of the cameras 101 and 102 are overlapped with each other. FIG. 3B illustrates a state that the side faces of the cameras 101 and 102 are overlapped with each other. FIG. 3C illustrates a state that the rear faces of the cameras 101 and 102 are overlapped with each other. As shown in FIGS. 3A to 3C, how the cameras are overlapped is not particularly limited.

Figure 4:
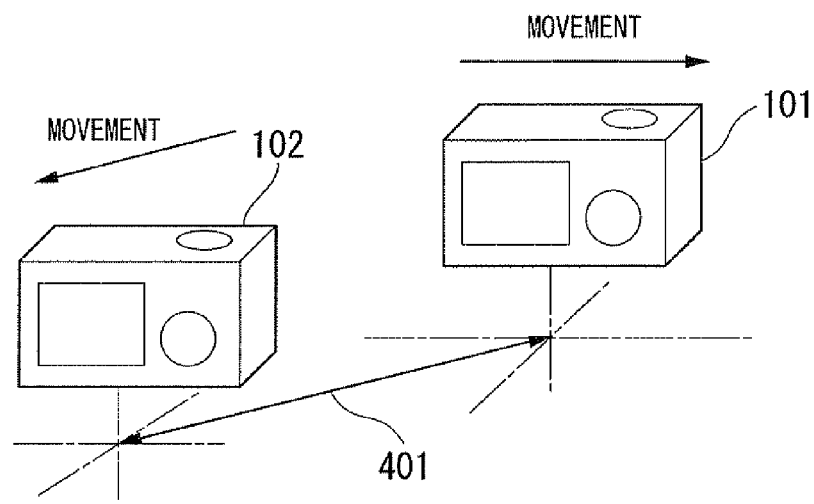
FIG. 4 is a reference diagram showing a method of obtaining a relative position relationship using a camera according to an embodiment of the present invention.

FIG. 4 illustrates a method of measuring a relative distance when the cameras 101 and 102 are moved after the relative distance is obtained as shown in FIGS. 3A to 3C. When the cameras 101 and 102 are moved, the movement amount detection unit 208 of the cameras 101 or 102 measures the movement amount in each direction of the X-axis, Y-axis, and Z-axis from the reference position described in FIGS. 3A to 3C. The cameras 101 and 102 notify each other of the movement amount in each direction of the X-axis, Y-axis, and Z-axis from the reference position. In addition, in the camera 102, the relative position computation unit 211 computes the relative distance 401 based on the movement amount thereof.

(Second Example of Obtaining Relative Distance)

Figure 5:
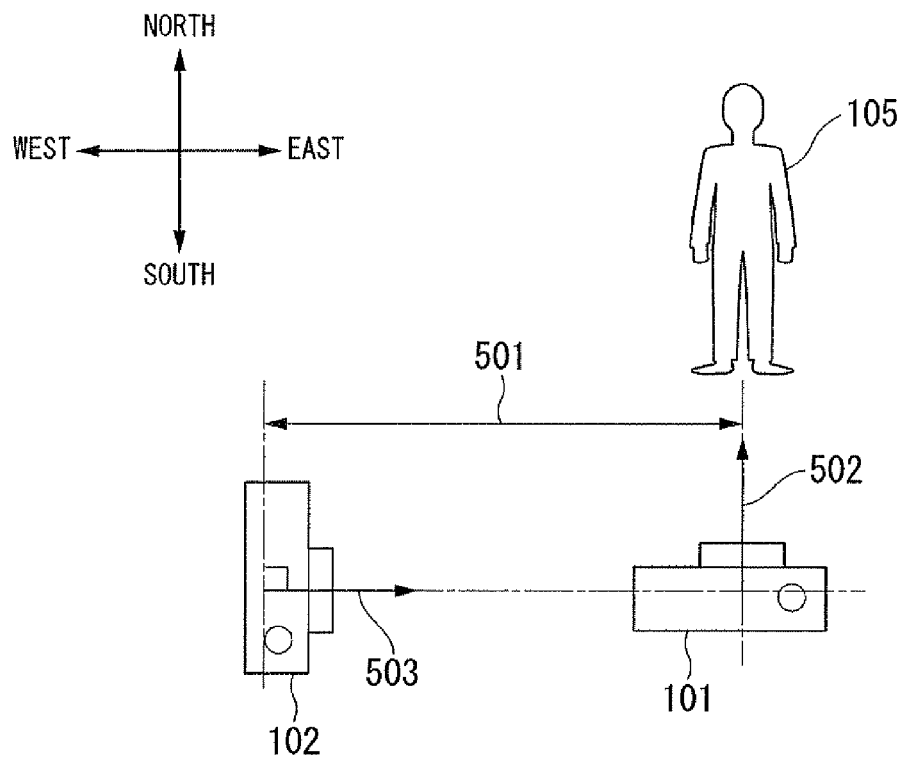
FIG. 5 is a reference diagram showing a method of obtaining a relative position relationship using a camera according to an embodiment of the present invention.

Hereinafter, the second example of obtaining the relative distance will be described. FIG. 5 illustrates a method of measuring a relative distance when the cameras 101 and 102 are separately arranged which is different from the method of FIGS. 3 and 4. FIG. 5 illustrates the state of the cameras 101 and 102 as seen in a top plan view.

First, similar to FIG. 5, the camera 101 is directed to the subject 105, and the finder of the camera 101 recognizes the subject 105. At this moment, it is assumed that the orientation 502 of the camera 101 is set to north. The camera 102 measures the relative distance from the camera 101 by using the position of the camera 101 as a reference position. For this purpose, a user orients the picture direction of the camera 102 toward the camera 101 and performs framing with the camera 101 as a subject. In this case, the orientation 503 of the camera 101 viewed from the camera 102 is east.

Subsequently, a user performs a ranging manipulation (AF manipulation) on the input unit 214 of the camera 102 to instruct measurement of a relative distance from the camera 101. In the camera 102, the ranging unit 201 measures the relative distance 501 from the camera 101. As a result, the camera 102 can obtain the relative distance from the camera 101.

(Exemplary Method of Obtaining Height Difference)

Figure 6:
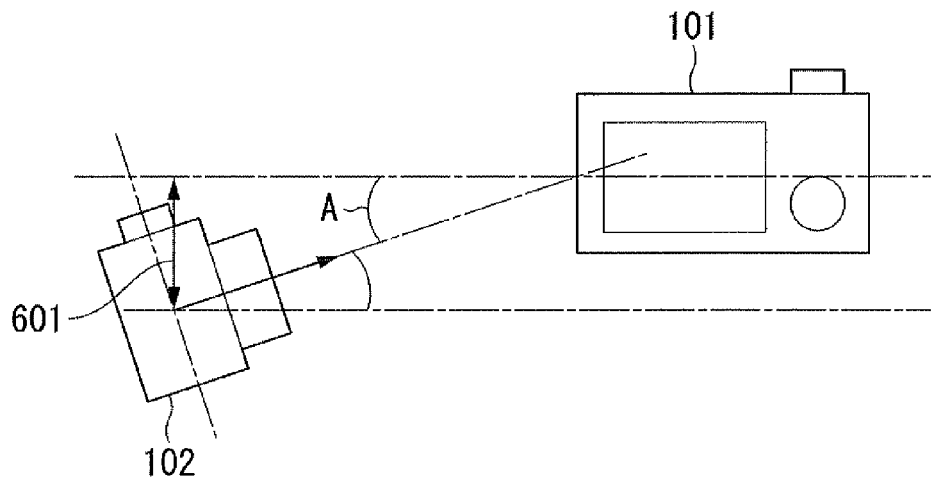
FIG. 6 is a reference diagram showing a method of obtaining a relative position relationship using a camera according to an embodiment of the present invention.

Hereinafter, an exemplary method of obtaining a height difference will be described. FIG. 6 illustrates a method of measuring a height difference set between the cameras. The relative distance can be obtained as the relative positional relationship in the X-axis and Y-axis directions based on the method described in conjunction with FIGS. 4 and 5. However, in order to perform the framing after obtaining the relative distance, it is necessary to recognize the relative positional relationship in the Z-axis direction between the cameras.

As shown in FIG. 6, a user orients the picture direction of the camera 102 toward the camera 101. In the camera 102, the posture detection unit 210 measures the pitching angle A when the camera 102 is oriented toward the camera 101 with respect to the pitching angle at the initial state where the camera is oriented in the horizontal direction. The relative position computation unit 211 computes the height difference 601 from the camera 101 based on the obtained pitching angle A. Specifically, the relative position computation unit 211 computes the height difference 601 according to the formula (a relative distance between the cameras 101 and 102)×sin A. As a result, the camera 102 can obtain a relative positional relationship with the camera 101.

(Exemplary Method of Matching Framing)

Next, a description will be made for a method of matching framing between the cameras by computing the movement amount (adjustment amount) for framing based on the relative positional relationship obtained through the aforementioned method. While rotation with respect to three axes, the Z-axis (yawing angle), the Y-axis (pitching angle), and the X-axis (rolling angle), are necessary when the framing is performed by changing the camera direction, a method of computing the movement amount in each direction will be described hereinafter.

Figure 7:
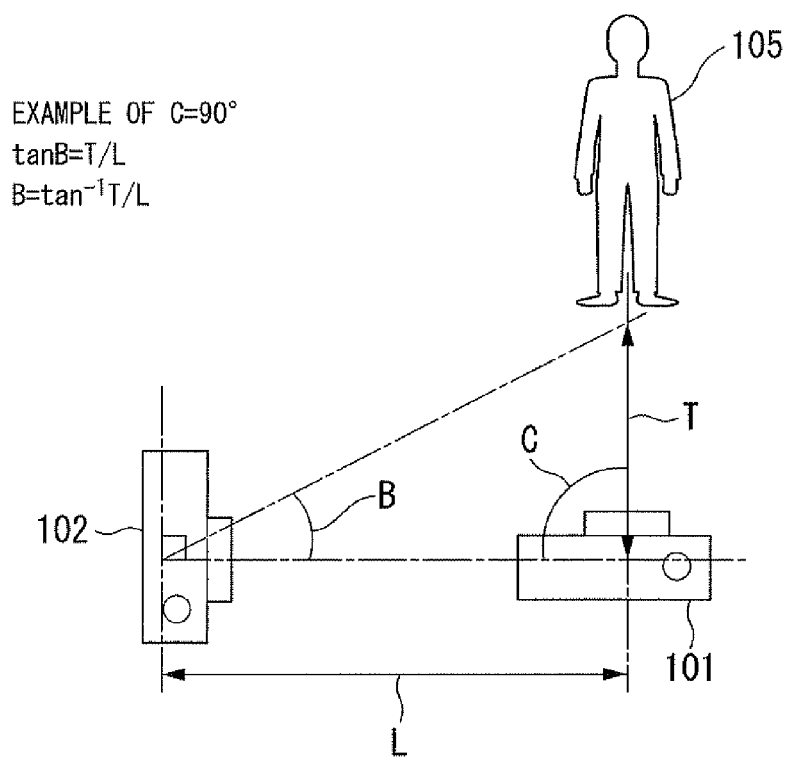
FIG. 7 is a reference diagram showing a method of computing a movement amount for framing using a camera according to an embodiment of the present invention.

FIG. 7 illustrates a method of computing the movement amount around the Z-axis for orienting the picture direction of the camera 102 toward the subject 105 in a similar way to that of the camera 101. The finder of the camera 101 is directed to the subject 105 by a user's manipulation or the like and the finder of the camera 101 recognizes the subject 105. The ranging unit 201 of the camera 101 measures the distance T from the subject 105. In addition, the posture detection unit 210 of the camera 101 detects the direction (orientation) of the camera 101. Based on this orientation, it is possible to obtain the angle C using a predetermined orientation (west in FIG. 7) as a reference. The camera 101 transmits such information to the camera 102.

The camera 102 receives such information. In the camera 102, the relative position computation unit 211 computes the angle B as a relative positional relationship based on the relative distance obtained through aforementioned method. If the angle C is set to 90°, it is possible to compute the angle B based on the formula $B=\tan^{-1} T/L$ obtained from the formula $\tan B=T/L$. In response to the computed angle B, the camera 102 displays the movement amount around the Z-axis on the finder of the display unit 205 to prompt a user to change the direction of the camera. Alternatively, the camera 102 notifies the camera platform 104 of the movement amount around the Z-axis and controls the camera platform 104 to direct the finder of the camera 102 toward the subject 105. As a result, it is possible to orient the picture direction of the camera 102 toward the subject 105.

Figure 8:
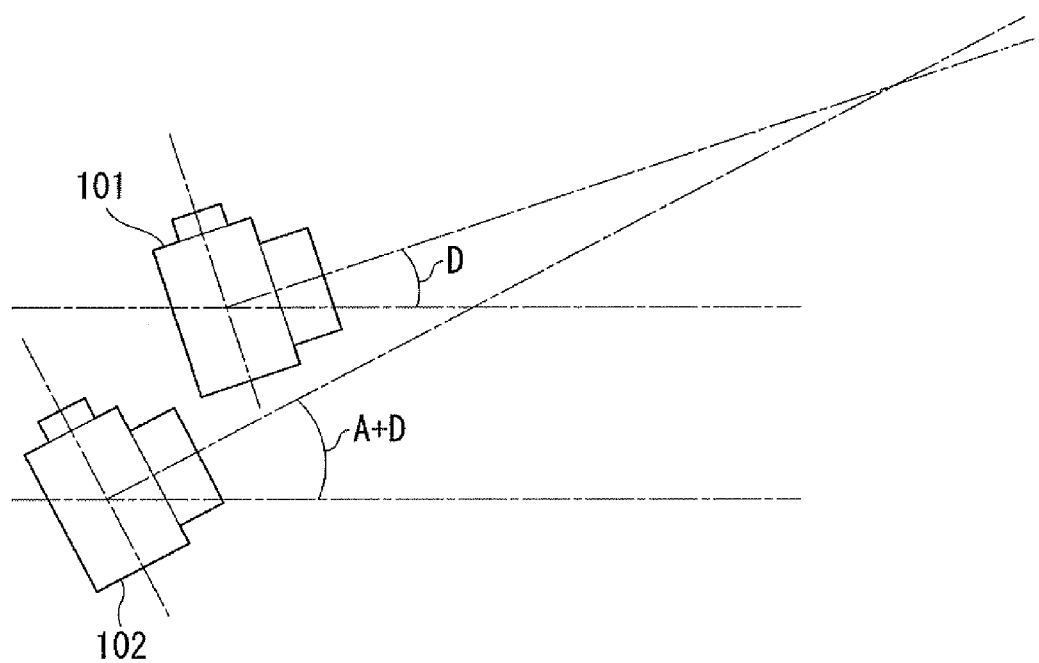
FIG. 8 is a reference diagram showing a method of computing a movement amount for framing using a camera according to an embodiment of the present invention.

FIG. 8 illustrates a method of computing the movement amount around the Y-axis for directing the camera 102 toward the subject 105. In the camera 101, the posture detection unit 210 detects the angle D in the pitching angle direction by using, as a reference, the pitching angle of the initial state where the camera is oriented in the horizontal direction. The camera 101 transmits the information regarding the angle D to the camera 102. The camera 102 receives the information regarding the angle D. In the camera 102, the framing computation unit 207 computes the pitching angle by summing the angles A and D described above in conjunction with FIG. 6. The camera 102 displays an instruction for adjusting the pitching angle of the camera 102 to the summed pitching angle on the finder of the display unit 205. Alternatively, the camera 102 notifies the camera platform 104 of the movement amount around the Y-axis.

Figure 9:
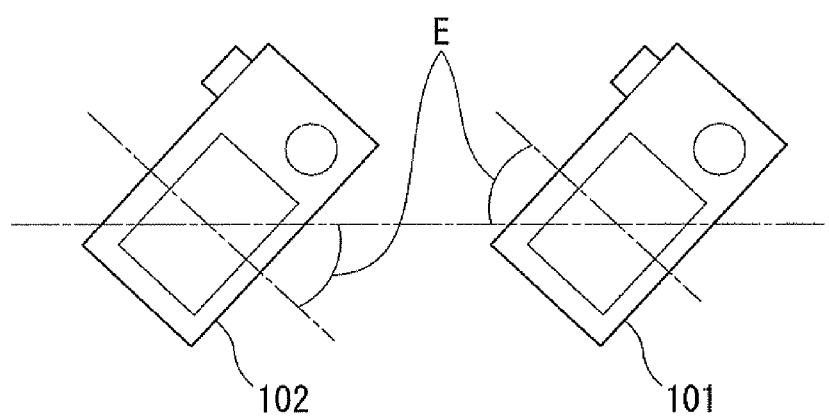
FIG. 9 is a reference diagram showing a method of computing a movement amount for framing using a camera according to an embodiment of the present invention.

FIG. 9 illustrates a method of adjusting the inclination (angle around the X-axis) of the cameras 101 and 102 with respect to the horizontal direction. In the camera 101, the posture detection unit 210 detects the inclination with respect to the horizontal direction and obtains the angle E. The camera 101 transmits the information regarding the angle E to the camera 102. The camera 102 receives the information regarding the angle E and displays, and on the finder of the display unit 205, the instruction for prompting a user to adjust the inclination. Alternatively, the camera 102 notifies the camera platform 104 of the movement amount around the X-axis. As a result, the camera 102 can rapidly perform framing for the subject 105 located in the picture direction of the camera 101.
(Exemplary Method of Displaying Instruction of Framing)

Figure 10A:
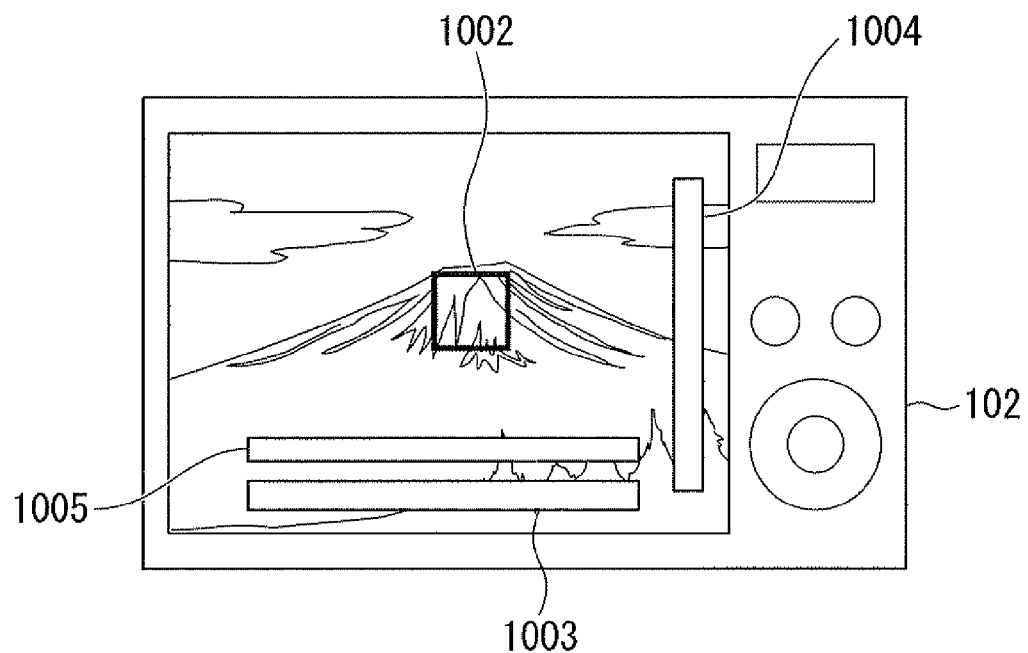
FIG. 10A is a reference diagram showing a method of displaying an instruction for framing using a camera according to an embodiment of the present invention.
Figure 10B:
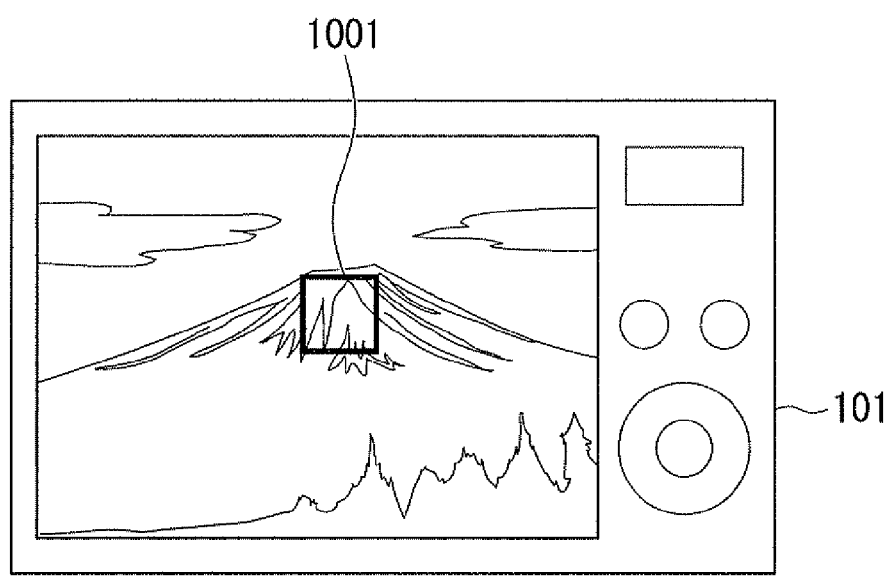
FIG. 10B is a reference diagram showing a method of displaying an instruction for framing using a camera according to an embodiment of the present invention.

Next, a description will be made for a method of displaying an instruction for framing to a user. FIGS. 10A and 10B illustrate a state that an instruction for the movement direction of the camera is displayed for a user on the finder of the display unit 205 when the framing is matched as described above. FIG. 10A illustrates a state that the instruction is displayed on the finder of the display unit 205 of the camera 102. FIG. 10B illustrates a state of the finder of the camera 101.

The camera 101 matches a focus frame 1001, which determines the focus position, with the subject. The camera 102 displays the movement amount (adjustment amount) around each axis, computed using the aforementioned method, on the finder. Information displayed thereon includes a directional movement amount indication index 1003 for directing the camera 102 in the direction (orientation) of the subject 105 described in conjunction with FIG. 7, an pitching angle movement amount indication index 1004 for indicating the pitching angle described in conjunction with FIG. 8, and a horizontal direction indication index 1005 for indicating the inclination with respect to the horizontal direction described in conjunction with FIG. 9. As means for displaying each index, how long the camera 102 should be moved to the target position is displayed, for example, on a scale.

In addition, the camera 102 displays the focus position as the focus frame 1002. When a user manipulates the camera 102 according to the index displayed on the finder of the camera 102, a plurality of cameras can be directed to the same subject.
(Method of Matching Framing Between Two Cameras)

Figure 11:
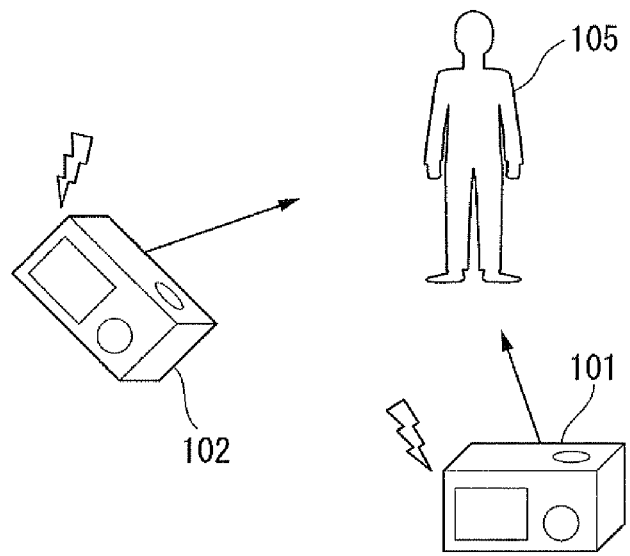
FIG. 11 is a reference diagram illustrating a state that a camera captures an image of the subject according to an embodiment of the present invention.
Figure 12A:
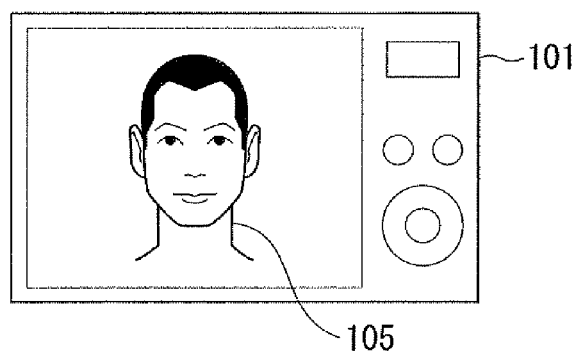
FIG. 12A is a reference diagram illustrating a state that a camera displays a subject according to an embodiment of the present invention.
Figure 12B:
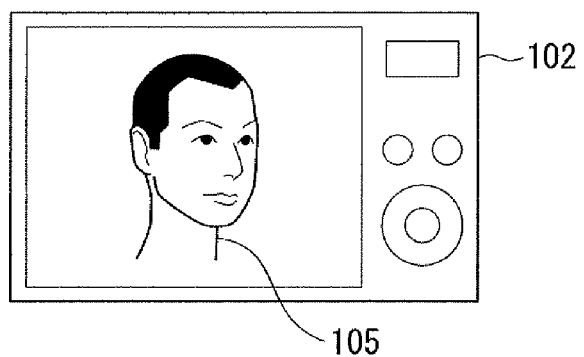
FIG. 12B is a reference diagram illustrating a state that a camera displays a subject according to an embodiment of the present invention.

Next, a description will be made for a specific example of a method of matching framing into the same subject. FIG. 11 illustrates a state that the subject 105 is imaged by two cameras 101 and 102 from different angles. At this moment, live view images are displayed on the finders of the cameras 101 and 102 as shown in FIGS. 12A and 12B. Referring to FIG. 12A, the camera 101 recognizes the subject 105 from the front. In addition, referring to FIG. 12B, the camera 102 recognizes the subject 105 from the side.

Figure 13A:
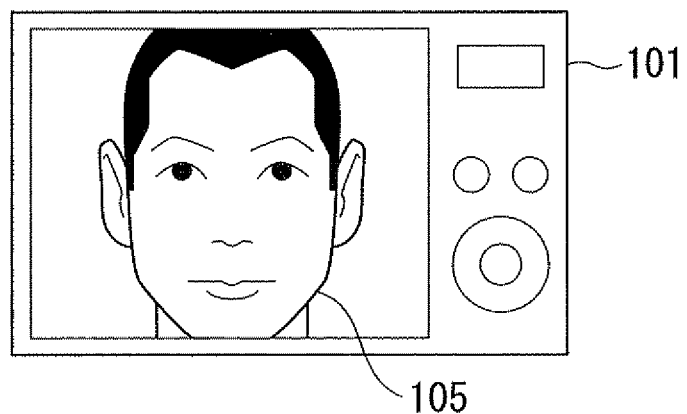
FIG. 13A is a reference diagram illustrating a state that a camera displays a subject according to an embodiment of the present invention.
Figure 13B:
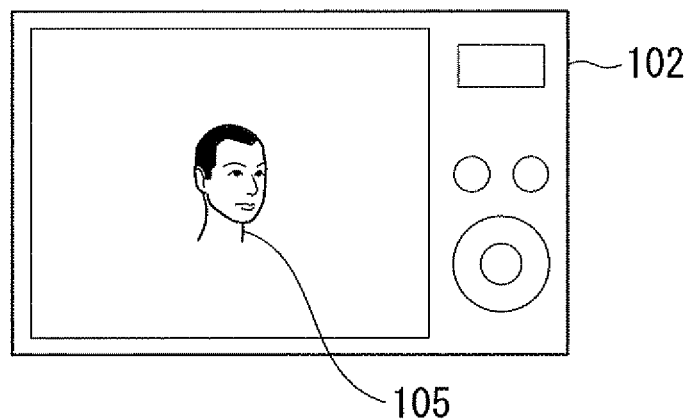
FIG. 13B is a reference diagram illustrating a state that a camera displays a subject according to an embodiment of the present invention.

Even when the picture direction of the camera 102 is adjusted with the camera 101 as a reference, the shot manipulation of the camera 102 is not limited. Therefore, as shown in FIGS. 13A and 13B, one of the cameras 101 and 102 may take a picture using a zoom-in manipulation, and the other may take a picture using a wide view manipulation. In this manner, for the same subject, framing may be performed freely, or a picture may be taken freely.
(First Example of Framing Instruction Operation)

Figure 14:
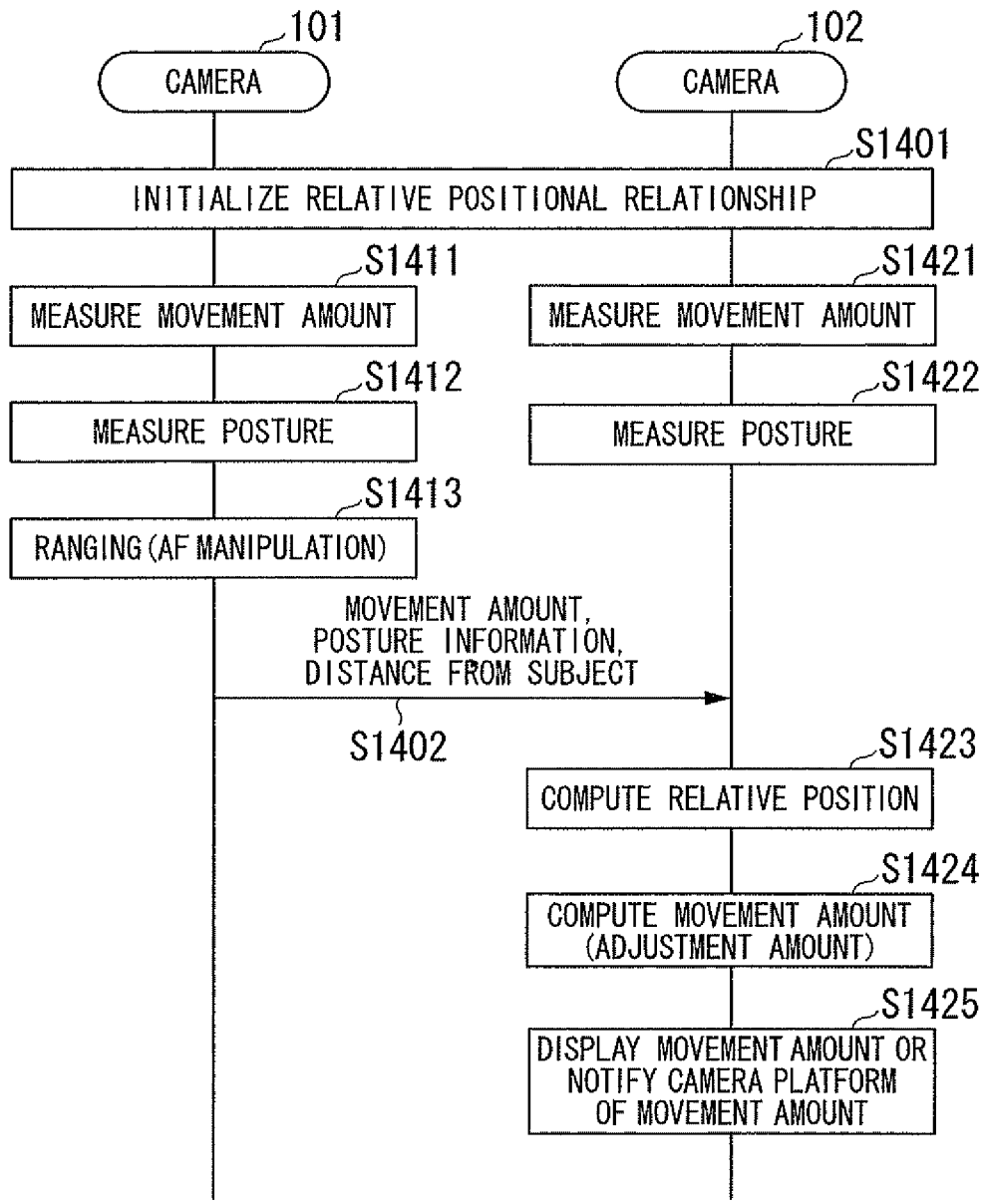
FIG. 14 is a sequence diagram illustrating a framing instruction operation of a camera according to an embodiment of the present invention.

Next, an operation for instructing framing will be described. FIG. 14 illustrates a first example of the operation of the imaging system up until the framing instruction relating to the picture direction of the camera is performed.

First, the cameras 101 and 102 initialize the relative positional relationship between the cameras (step S1401). The initialization of the relative positional relationship is performed, after the relative distance between the cameras is set to zero as shown in FIGS. 3A to 3C, by assuming a case where a user moves the camera 101 or 102 as shown in FIG. 4 (first case) and a case where the cameras 101 and 102 are arranged as shown in FIG. 5 (second case). Hereinafter, a description will be provided for the first case.

Subsequently, the movement amount detection units 208 of the cameras 101 and 102 measure the movement amount of itself from the reference position (steps S1411 and S1421). In addition, the posture detection units 210 of the camera 101 or 102 measure the posture of itself (steps 1412 and S1422). The posture information resulting from the aforementioned measurements includes orientations and rotation amounts (angles) around each of the X-axis, the Y-axis, and the Z-axis. The movement amounts and the posture information are stored in the storage unit 215.

Subsequently, the ranging unit 201 of the camera 101 measures the distance from the subject based on the AF manipulation of the input unit 214 by a user (step S1413). Subsequently, the communication unit 213 of the camera 101 transmits information including the distance from the subject, the posture information, and the movement amounts to the camera 102. The communication unit 213 of the camera 102 receives this information (step S1402).

The relative position computation unit 211 of the camera 102 reads the posture information and the movement amount of the camera 102 from the storage unit 215 and computes the relative positional relationship with the camera 101 based on this information and the information received from the camera 101 (step S1423). As a result, as described above in conjunction with FIGS. 4 and 6, the relative positional relationship including the relative distance from the camera 101 and the height difference from the camera 101 is computed.

Subsequently, the framing computation unit 207 of the camera 102 computes the movement amount (adjustment amount) necessary for framing (step S1424). As a result, as described above in conjunction with FIGS. 7 to 9, the movement amounts (rotation amounts) around three axes such as the Z-axis (yawing angle), the Y-axis (pitching angle), and the X-axis (rolling angle) are computed.

Subsequently, the finder of the display unit 205 of the camera 102 displays, for example, the movement amounts as described above in conjunction with FIGS. 10A and 10B and prompts a user to move the picture direction of the camera (step S1425). Alternatively, the camera 102 notifies the camera platform 104 of electronic signals to operate the camera platform 104 (step S1425).

In the second case described above, the framing is instructed in approximately the same sequence as that described above. However, in the second case, the sequence is initiated after the movement of the cameras 101 and 102 is completed. In addition, in step S1401, the relative distance from the camera 101 is measured using the ranging unit 201 of the camera 102 while the finder of the camera 102 is directed to the camera 101.

Figure 15:
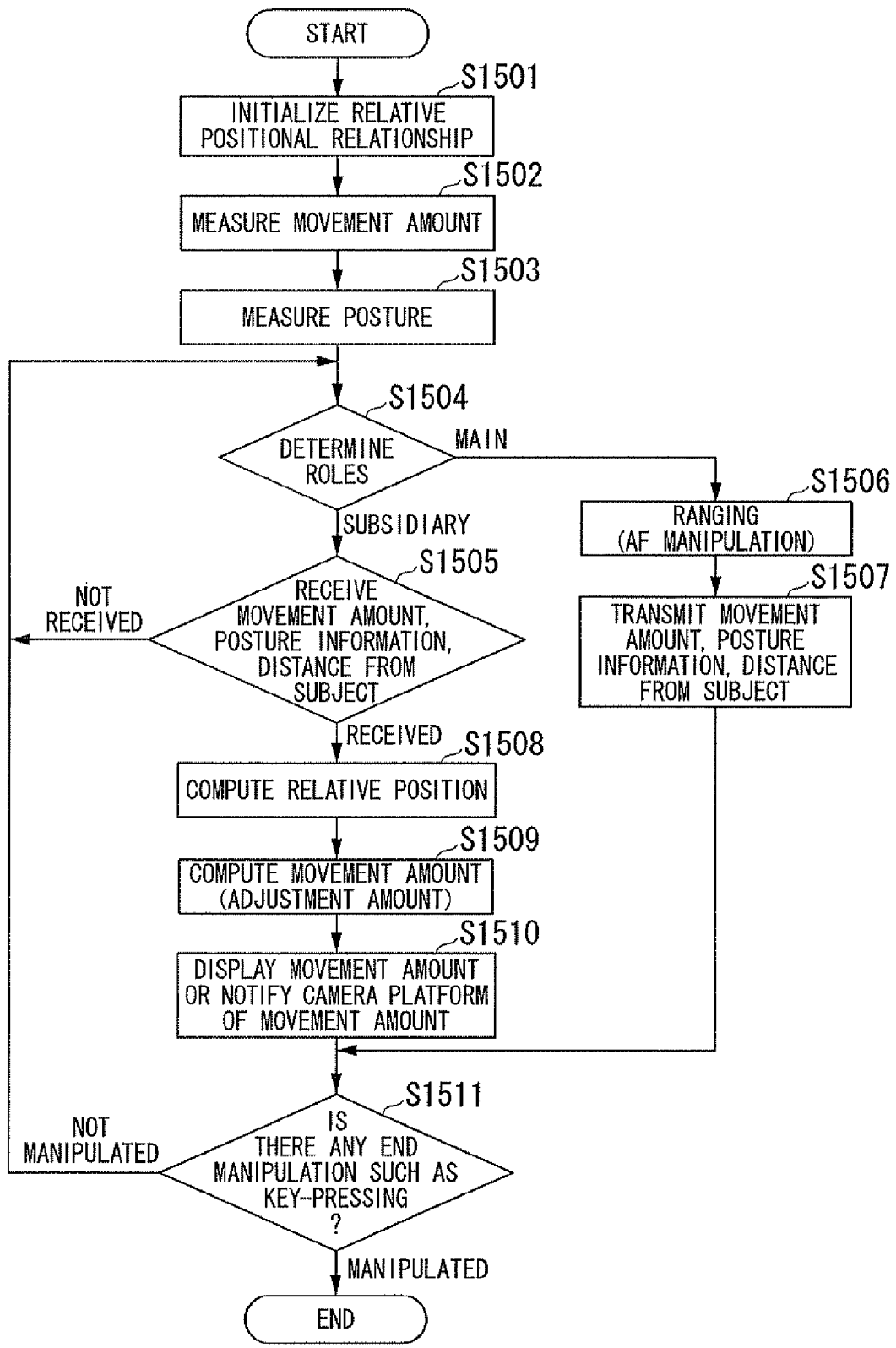
FIG. 15 is a flowchart illustrating a framing instruction operation of a camera according to an embodiment of the present invention.

FIG. 15 illustrates operations of the cameras 101 and 102 up until the framing instruction relating to the picture direction of the camera is performed. FIG. 15 corresponds to FIG. 14. Which one of the cameras 101 and 102 takes a role of a main (reference) camera or a subsidiary camera is not distinguished in the initial state.

First, the relative positional relationship between the cameras is initialized (step S1501), and the movement amount (step S1502) and the posture (step S1503) are measured. Then, a user selects roles of each camera at the timing of executing the ranging manipulation (AF manipulation) by pressing a release button or the like on either of the camera 101 or 102. Each camera determines the selected roles (step S1504). In this case, since the roles are determined for the AF manipulation, each camera has a user input standby state. Alternatively, the roles of the cameras 101 and 102 may be initially determined.

The camera for which a user executes the ranging manipulation becomes the main camera (camera 101) and the distance from the subject is measured (step S1506). Subsequently, the main camera transmits information including the movement amount, the posture information, and the distance from the subject to the subsidiary camera (camera 102) (step S1507).

The subsidiary camera repeats role determination (step S1504) and monitoring on whether the information has been received from the main camera (step S1505) if notification of the information by the main camera is not made. When information including the movement amount, the posture information, and the distance from the subject is received from the main camera, the subsidiary camera computes the relative positional relationship with the main camera based on the information received from the main camera and the movement amount and the posture information measured by itself (step S1508).

Subsequently, the subsidiary camera computes the movement amount (adjustment amount) necessary for framing (step S1509). Further, the subsidiary camera displays, for example, the movement amount on the finder of the display unit 205 to prompt a user to move the picture direction of the camera as described above in conjunction with FIGS. 10A and 10B (step S1510). Alternatively, the subsidiary camera notifies the camera platform of electronic signals to operate the camera platform (step S1510).

The operation of executing a framing instruction by cooperation between the cameras may be terminated by an end manipulation from a user (step S1511). If there is not end manipulation by a user, the processes from the step S1504 are repeated. Otherwise, if there is an end manipulation by a user, the aforementioned process is terminated.

Through the aforementioned operation, it is possible to adjust the picture direction of one of the cameras to the same subject using, as a reference, the picture direction of the other camera which receives the shot manipulation such as pressing the release button or the like.

(Second Example of Framing Instruction Operation)

Figure 16:
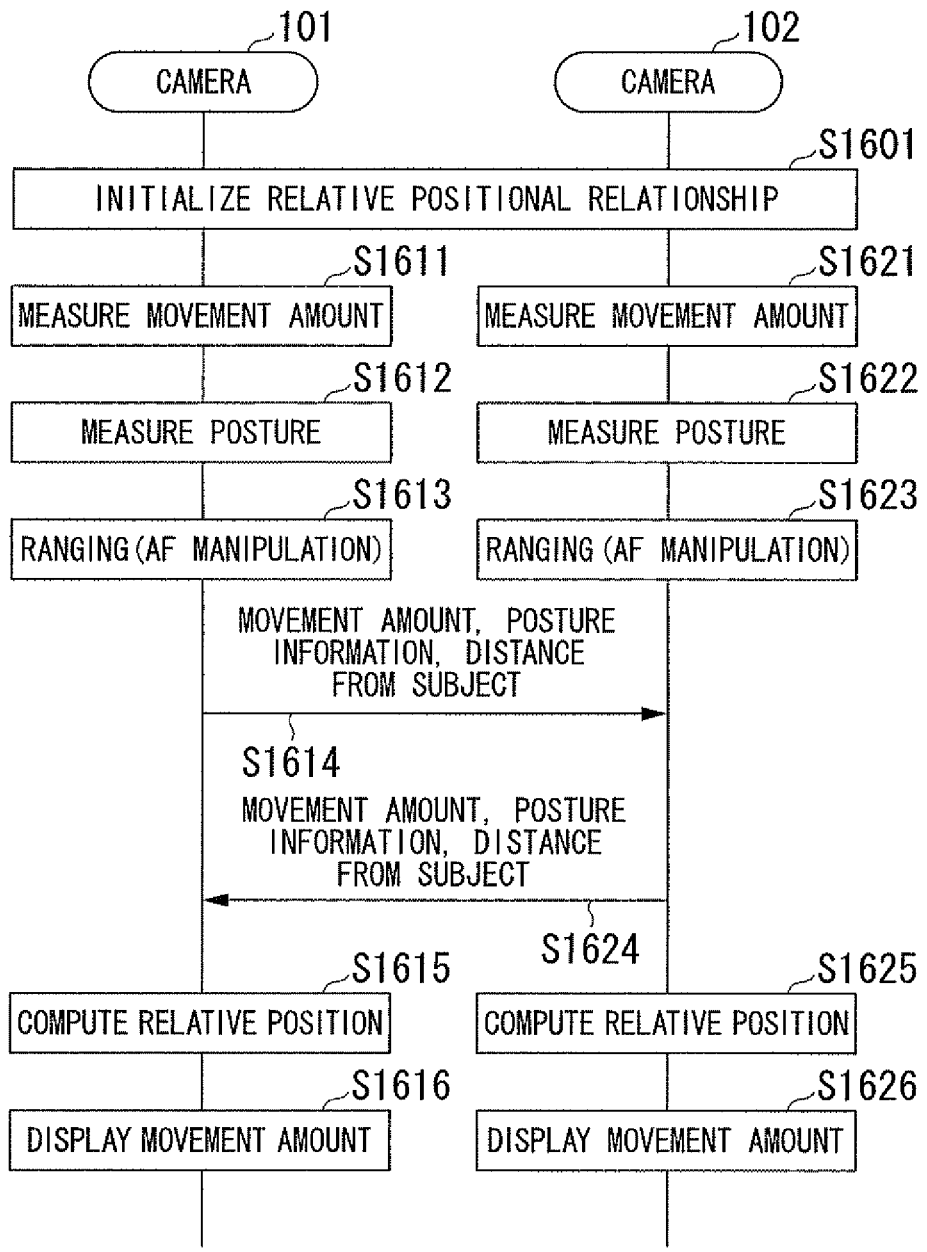
FIG. 16 is a sequence diagram illustrating a framing instruction operation of a camera according to an embodiment of the present invention.

FIG. 16 illustrates a second operation example of the imaging system up until the framing instruction relating to the picture direction of the camera is performed. In the first operation example shown in FIGS. 14 and 15, roles of each camera are determined, and the picture direction of one of the cameras is adjusted with the other camera as a reference. On the other hand, in the second operation example, the movement amount or the posture information is exchanged in both directions without clearly determining roles of each camera, and the framing instruction is displayed on the finders of the display units 205 of both cameras.

First, the cameras 101 and 102 initialize the relative positional relationship therebetween (step S1601). Hereinafter, a case will be described where the relative distance between the cameras is set to zero as shown in FIGS. 3A to 3C, and then, a user moves the cameras 101 and 102 as shown in FIG. 4.

Subsequently, the movement amount detection units 208 of the cameras 101 and 102 measure the movement amounts of themselves from a reference position (step S1611 and S1621). In addition, the posture detection units 210 of the cameras 101 and 102 measure the postures of themselves (step S1612 and S1622). The posture information resulting from such measurement includes the rotation amounts (angles) around the X-axis, the Y-axis, and the Z-axis and orientation information. The movement amounts and the posture information are stored in the storage unit 215.

Subsequently, the ranging units 201 of the cameras 101 and 102 measure the distance from the subject based on the AF manipulation of the input unit 214 by a user (step S1613 and S1623). Subsequently, the communication unit 213 of the camera 101 transmits information including the movement amount, the posture information, and the distance from the subject to the camera 102, and the communication unit 213 of the camera 102 receives this information (step S1614). On the other hand, the communication unit 213 of the camera 102 transmits the information including the movement amount, the posture information, and the distance from the subject to the camera 101, and the communication unit 213 of the camera 101 receives this information (step S1624). In this manner, the cameras 101 and 102 notify each other of information.

Subsequently, the relative position computation units 211 of the cameras 101 and 102 read the movement amounts and the posture information of themselves from the storage unit 215 and compute the relative positional relationship with the other camera based on such information and the information received from the other camera (step S1615 and S1625). As a result, as described above in conjunction with FIGS. 4 and 6, the relative positional relationship including the relative distance from the other camera and the height difference from the other camera is computed.

Subsequently, the framing computation units 207 of the cameras 101 and 102 compute the movement amount (adjustment amount) necessary for framing (step S1615 and S1625). As a result, as described above in conjunction with FIGS. 7 to 9, the movement amounts (rotation amounts) around three axes such as the Z-axis (yawing angle), the Y-axis (pitching angle), and the X-axis direction (rolling angle) are computed.

Subsequently, the finders of the display units 205 of the cameras 101 and 102 display, for example, the movement amounts as described above in conjunction with FIGS. 10A and 10B to prompt a user to move the picture direction of the camera (step S1616 and S1626). Through the aforementioned operation, both the cameras 101 and 102 compute and display the relative positional relationship with the counterpart camera as a reference and the movement amount of itself for framing. While looking at one of the finders of the cameras 101 and 102, a user can adjust the picture direction of the camera having that finder to the subject already disposed in the picture direction of the other camera.

The relative positional relationship between the cameras may be initialized in the state that the cameras 101 and 102 are disposed as shown in FIG. 5. In this case, the sequence is initiated after the movement of the cameras 101 and 102 is completed. In step S1601, the cameras 101 and 102 measure the relative distance from the counterpart camera using the ranging unit 201 while the picture direction of itself is directed to the counterpart camera.

Figure 17:
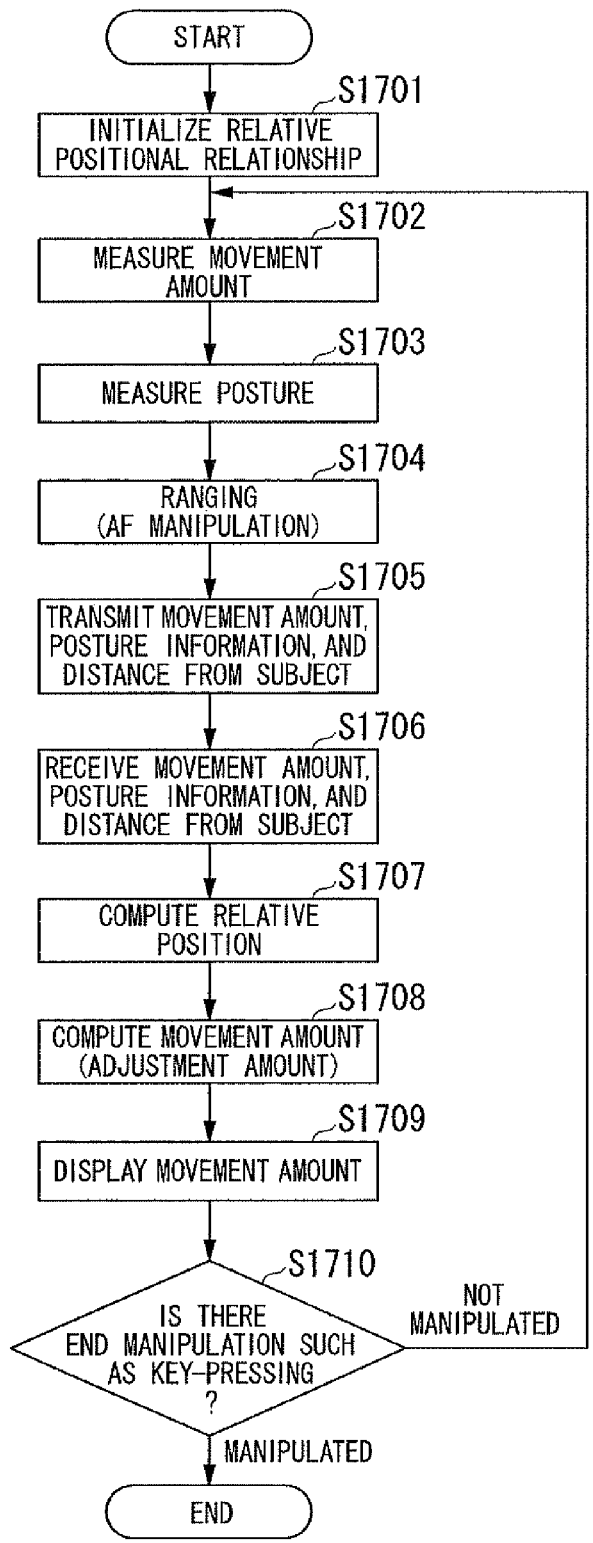
FIG. 17 is a flowchart illustrating a framing instruction operation of a camera according to an embodiment of the present invention.

FIG. 17 illustrates the operations of the cameras 101 and 102 up until the framing instruction relating to the picture direction of the camera is performed. FIG. 17 corresponds to FIG. 16. First, the relative positional relationship between the cameras is initialized (step S1701), and the movement amount (step S1702) and the posture (step S1703) are measured. Then, a user executes a ranging manipulation (AF manipulation) for each of the cameras 101 and 102 through manipulations such as pressing a release button or the like. As a result, the cameras 101 and 102 measure the distance from the subject (step S1704).

Subsequently, the cameras 101 and 102 transmit, to the counterpart camera, information including the movement amount, the posture information, and the distance from the subject (step S1705) and receive, from the counterpart camera, information including the movement amount, the posture information, and the distance from the subject (steps S1706). After receiving the information from the counterpart camera, the cameras 101 and 102 compute the relative positional relationship with the counterpart camera based on the movement amount and the posture information measured by themselves and the information received from the counterpart camera (step S1707).

Subsequently, the cameras 101 and 102 compute the movement amount (adjustment amount) necessary for framing (step S1708). The cameras 101 and 102 display, for example, the movement amount on the finder of the display unit 205 as described above in conjunction with FIGS. 10A and 10B to prompt a user to move the picture direction of the camera (step S1709). As a result, it is possible to adjust the picture direction of one of the cameras to the same subject with the picture direction of the other camera as a reference.

In addition, the operation of executing the framing instruction in cooperation with each camera can be terminated by an end manipulation from a user (step S1710). If there is no end manipulation from a user, the process advances to step S1702, and the processes from the step S1702 are repeated. Otherwise, if there is an end manipulation from a user, the aforementioned operation is terminated.

Through the aforementioned operation, it is possible to adjust the picture directions of each camera to the same subject at all times without considering which one of the cameras 101 and 102 is used as a reference.

(Method of Adjusting Focus)

Figure 18:
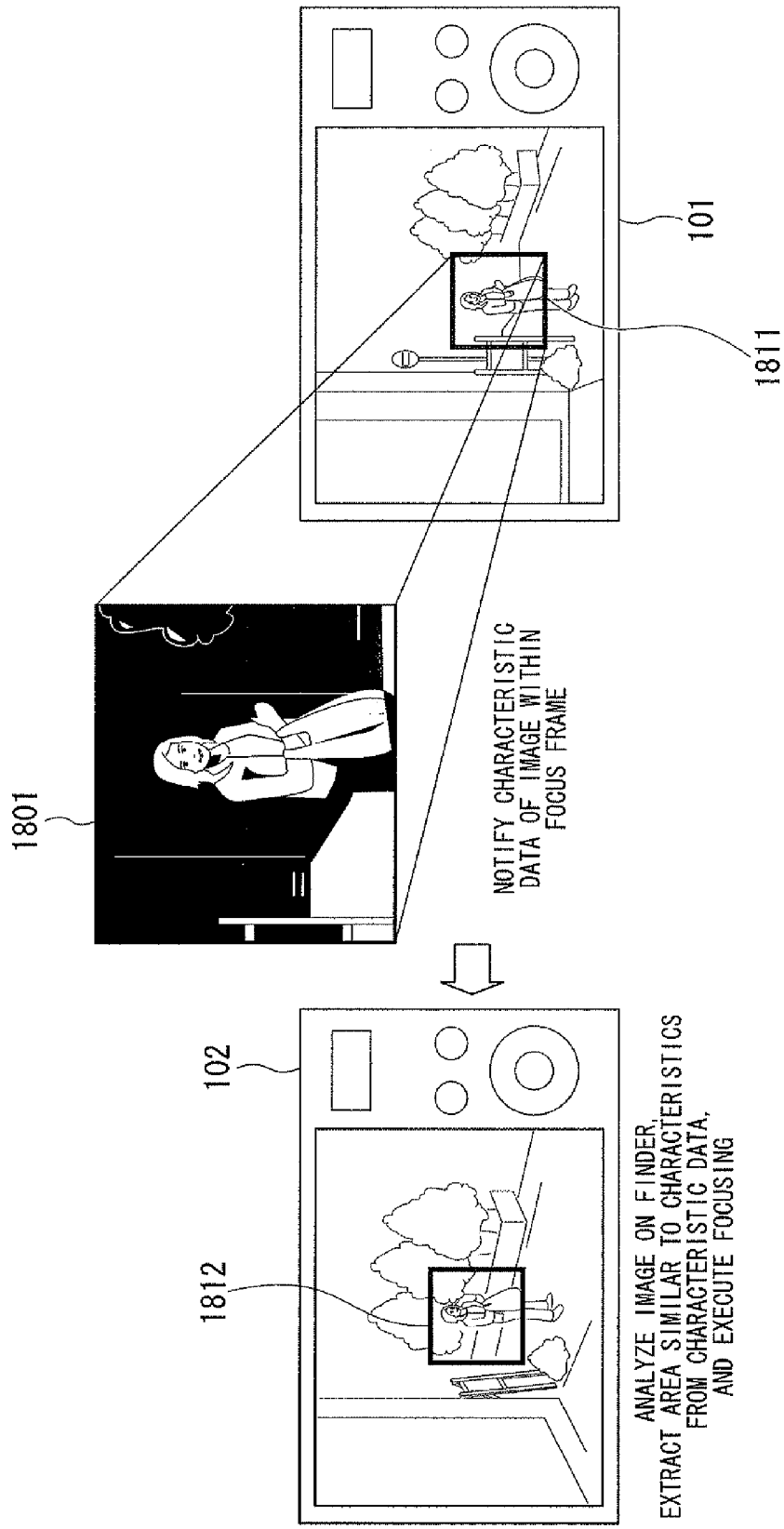
FIG. 18 is a reference diagram showing a method of adjusting a focus in a camera according to an embodiment of the present invention.

Next, a method of adjusting focus of each camera into the same subject after adjusting the framing will be described. FIG. 18 illustrates a method of adjusting focus when the focal lengths of the lenses of each camera are equal.

The camera 101 executes ranging (AF manipulation). In this case, as shown in FIG. 18, the camera 101 recognizes a person as a subject. The camera 101 extracts the characteristic data 1801 of the subject from the previously determined characteristic extraction area 1811. The method of determining the characteristic extraction area will be described below. The characteristic data includes, for example, information that can be obtained from image data such as color, grayscale, or shape of the subject. In FIG. 18, for example, binary data of the image is used as the characteristic data.

The camera 101 transmits the extracted characteristic data 1801 and the size information of the characteristic extraction area 1811 to the camera 102. After receiving the data, the camera 102 extracts the area 1812 having the characteristics similar to the characteristic data 1801 based on the image data produced by the camera 102. As a result, the camera 102 moves the focus point to the extracted area 1812 and focuses on that area.

Figure 19:
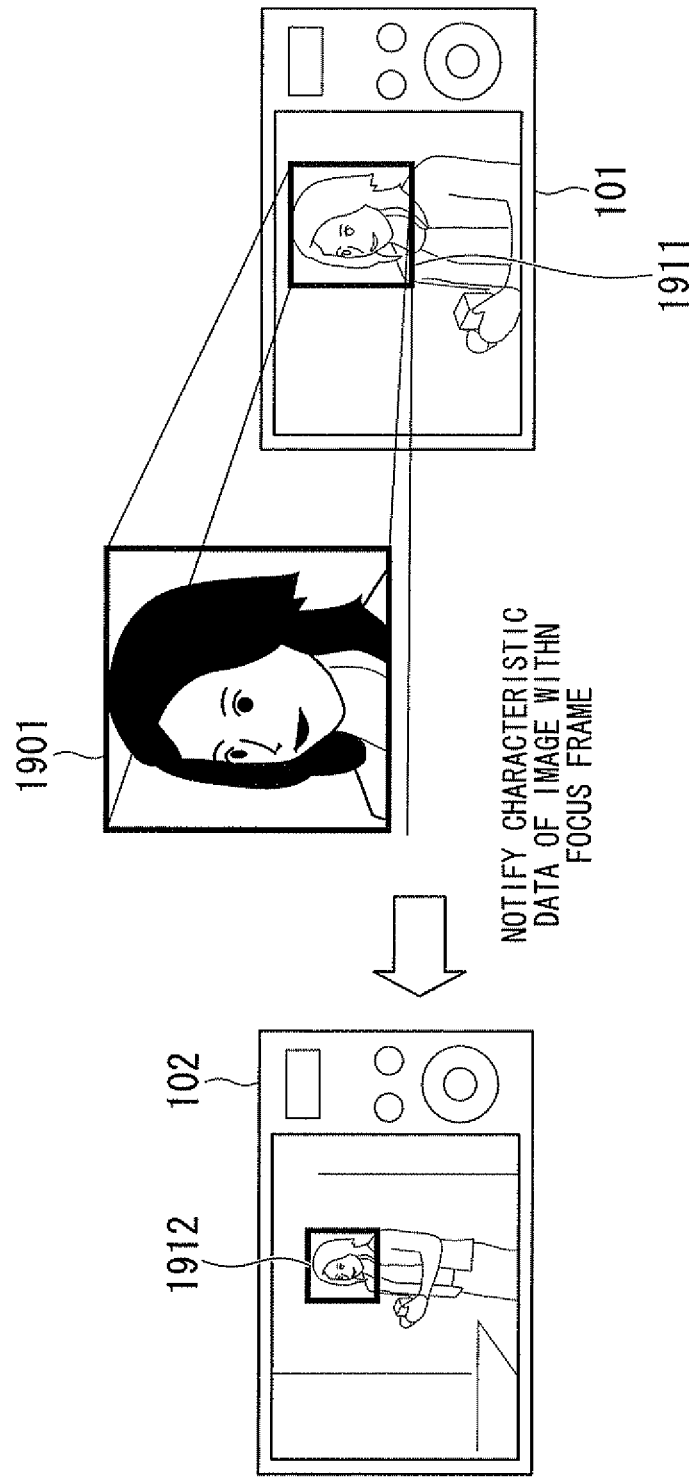
FIG. 19 is a reference diagram showing a method of adjusting a focus in a camera according to an embodiment of the present invention.

FIG. 19 illustrates a method of adjusting focus when focal lengths of the lenses of each camera are different from each other. This example corresponds to the case where the focal length of the lens of the camera 101 is short (zoom-in) and the focal length of the lens of the camera 102 is long (zoom-out). In this case, if the coordinates of the focus points match between the cameras 101 and 102 on each finder image, there is a possibility that the focus may be made on the subject which is completely different.

In this case, the camera 101 determines an appropriate characteristic extraction area 1911 based on the focal length information of the cameras 101 and 102. The characteristic extraction area 1911 is enlarged or reduced depending on the focal length of each camera. The camera 101 extracts the characteristic data 1901 of the characteristic extraction area 1911 and transmits the size information of the characteristic extraction area 1911 and the characteristic data 1901 to the camera 102.

After the camera 102 received such information, the camera 102 extracts the area 1912 having similar characteristics to that of the characteristic data 1901 based on the image data created from the camera 102, and moves the focus point into that area 1912 to focus thereon. As a result, even when the focus point is not centered on the finder image, such as when the focal length is different or in the case of a panorama shot, each camera can focus on the same subject.

(Exemplary Focus Adjustment Operation)

Figure 20:
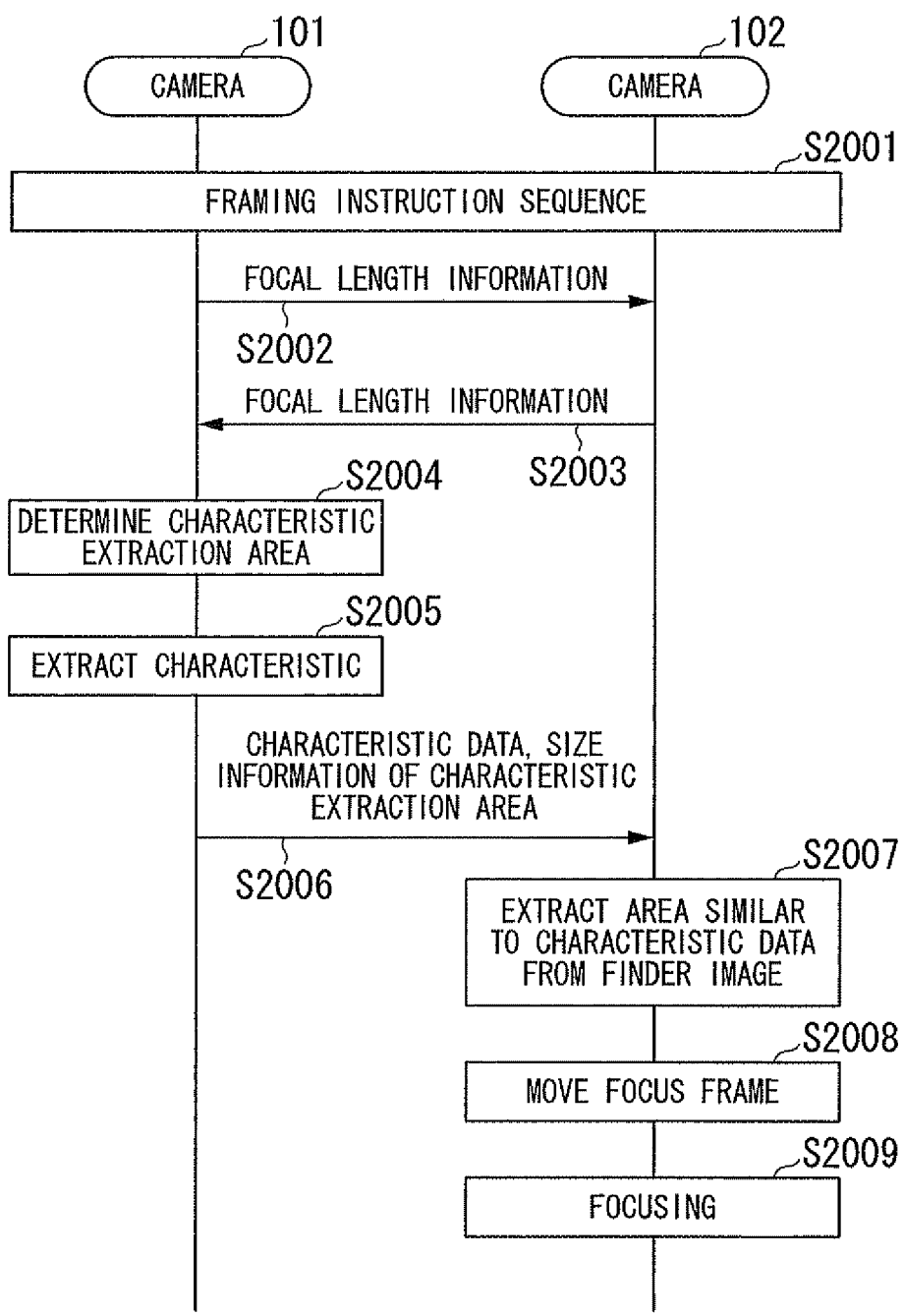
FIG. 20 is a sequence diagram illustrating a focus adjustment operation of a camera according to an embodiment of the present invention.

FIG. 20 illustrates an operation of determining the focus points and matching the focus points. The cameras 101 and 102 are directed to the same subject according to the aforementioned framing adjustment method (step S2001).

Subsequently, the communication units 213 of each camera 101 and 102 transmit, to the counterpart camera, the focal length information representing the focal length of the imaging unit 202. In addition, the communication units 213 receive the focal length information from the counterpart camera. As a result, the cameras 101 and 102 notify each other of the current focal length of itself (steps S2002 and S2003).

Here, the camera 101 may take a role of the main camera as described above. The area determination unit 212 of the camera 101 determines the characteristic extraction area based on the focal length information received from the camera 102 and the focal length information of the camera 101 (step S2004). As this determination method, for example, a method is selected where the size of the characteristic extraction area is adjusted by comparing the focal length of each camera. A difference between the focal lengths of the cameras 101 and 102 means the size of the subject located within the finders of each camera. In this regard, the characteristic extraction area is determined based on the ratio between the focal lengths of the cameras 101 and 102, that is, the ratio of the size of the displayed subject.

In the case where the ratio of the subject displayed on the finder is not significantly different, the characteristic extraction area may be determined using the focus frame having a longer focal length as a reference. However, in the case where the ratio of the subject displayed on the finder is significantly different, it is not limited to the entire area indicated by the focus frame of the finder having a longer focal length being displayed on the finder having a shorter focal length. In this case, the area corresponding to the entire finder image having a shorter focal length is determined as the characteristic extraction area. In addition, the position of the characteristic extraction area is determined to be the position corresponding to the position of the focus point of the camera 101.

Subsequently, the imaging unit 202 of the camera 101 images the subject to create image data, and the image processing unit 203 processes the image data. Further, the characteristic extraction unit 206 creates the characteristic data by extracting the characteristics from the data corresponding to the characteristic extraction area determined by the area determination unit 212 from the image data processed by the image processing unit 203 (step S2005). Subsequently, the communication unit 213 of the camera 101 transmits the characteristic data and the size information of the characteristic extraction area to the camera 102, and the communication unit 213 of the camera 102 receives the characteristic data and the size information of the characteristic extraction area from the camera 101 (step S2006).

Subsequently, the area determination unit 212 of the camera 102 determines the area (detection target area) which is a target of the processing for detecting the area having the characteristics represented by the characteristic data based on the focal length information and the size information of the characteristic extraction areas of the cameras 101 and 102. In addition, the imaging unit 202 images the subject to create image data, and the image processing unit 203 processes the image data. Further, the characteristic matching unit 209 detects a portion similar to the characteristics represented by the characteristic data received from the camera 101 from the data of the area determined by the area determination unit 212 of the image data processed by the image processing unit 203 using a template matching method or the like (step S2007).

If the focal length is different between the cameras, the size of the subject displayed on the finder of each camera is different. Therefore, in step S2007, the area determination unit 212 computes the ratio (magnification) of the subject displayed on the finder of each camera by obtaining the ratio of the focal length of each camera. Further, the size of the detection target area is determined by multiplying the size of the characteristic extraction area by the ratio (magnification) of the subject. In addition, in step S2007, the characteristic matching unit 209 detects a portion similar to the characteristics represented by the characteristic data while moving the position of the detection target area on the image indicated by the image data processed by the image processing unit 203.

After detection of the similar portion as described above, the focus adjustment unit 204 moves the focus frame to the similar portion (step S2008) and executes focusing (matching the focus points) (step S2009). In addition, when the size of the focus frame is different in each camera, the size may be exchanged with each other by mutual communication.

Figure 21:
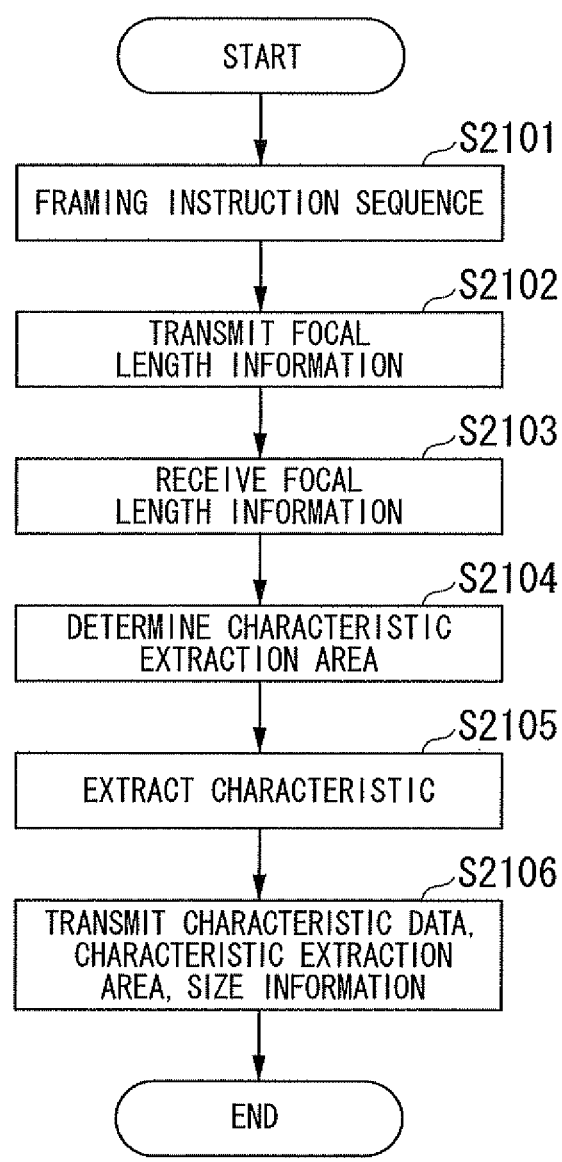
FIG. 21 is a flowchart illustrating a focus adjustment operation of a camera according to an embodiment of the present invention.

FIG. 21 illustrates the operation of the camera 101 (main or reference camera) during the focus adjustment. First, the framing is instructed as described above in conjunction with FIGS. 14 to 17 (step S2101). Subsequently, the camera 101 transmits the focal length information to the camera 102 (step S2102) and receives the focal length information from the camera 102 (step S2103).

Subsequently, the camera 101 determines the characteristic extraction area based on the focal length information of the cameras 101 and 102 as described above in conjunction with FIG. 20 (step S2104) and creates the characteristic data by extracting the characteristics from the image data of the characteristic extraction area (step S2105). Further, the camera 101 transmits the characteristic data to the camera 102 (step S2106).

Figure 22:
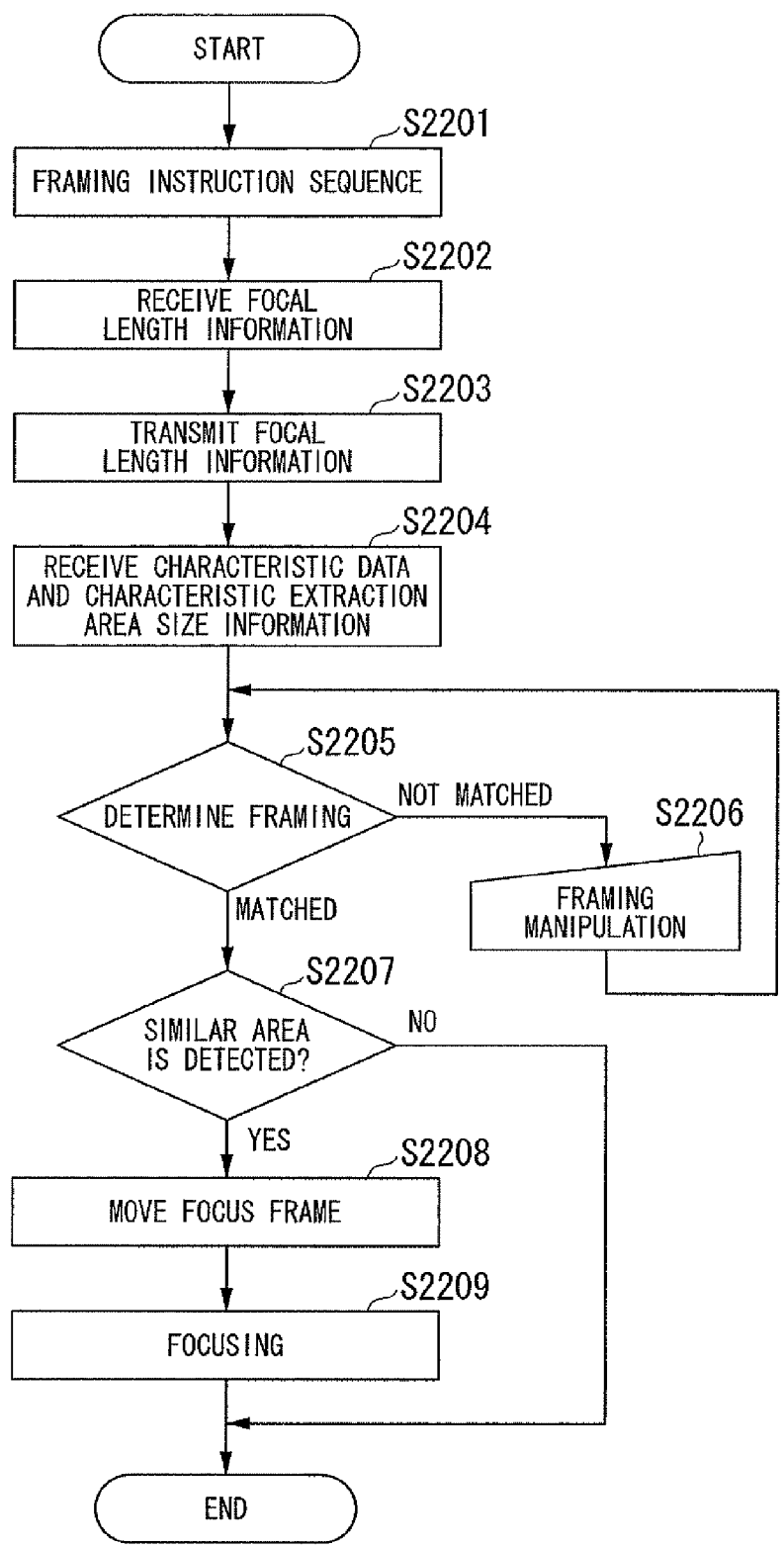
FIG. 22 is a flowchart illustrating a focus adjustment operation of a camera according to an embodiment of the present invention.

FIG. 22 illustrates the operation of the camera 102 (subsidiary camera) during the focus adjustment. First, the framing is instructed as described above in conjunction with FIGS. 14 to 17 (step S2201). Here, a user manipulates the camera 102 to execute framing. Subsequently, the camera 102 receives the focal length information from the camera 101 (step S2202) and transmits the focal length information to the camera 101 (step S2203). Subsequently, the camera 102 receives the characteristic data and the size information of the characteristic extraction area from the camera 101 (step S2204).

Subsequently, the camera 102 determines whether or not the camera 102 is directed to the subject located in the picture direction of the camera 101 (step S2205). In the framing instruction sequence of step S2201, the camera 102 computes the movement amount (adjustment amount) necessary for framing In step S2205, the camera 102 compares the movement amount produced by executing a user's manipulation relating to the framing with the movement amount necessary for framing. In the case where both movement amounts are equal to each other, it is determined that the picture direction of the camera 102 is directed to the subject located in the picture direction of the camera 101. Otherwise, in the case where both movement amounts are not equal to each other, it is determined that the camera 102 does not frame the subject framed by the camera 101.

In the case where the camera 102 is not directed to the subject located in the picture direction of the camera 101, the camera 102 displays an instruction for prompting a user to move the picture direction on the finder of the display unit 205. A user executes the framing manipulation based on this indication (step S2206).

On the other hand, in the case where the camera 102 is directed to the subject located in the picture direction of the camera 101, the camera 102 detects the area similar to the characteristics represented by the characteristic data from the image data created by the camera 102 based on the characteristic data received in step S2204 (step S2207). If there is no area similar to the characteristics represented by the characteristic data, the camera 102 does not focus and terminates the process. On the other hand, if the area similar to the characteristics represented by the characteristic data is detected, the camera 102 moves the focus frame to that area (step S2208) and performs a focusing (step S2209).

Through the aforementioned process, even when the focus point is not centered on the finder image, it is not necessary for a user to manually determine the focus point. Each camera rapidly focuses on the same subject.

As described above, according to the present embodiment, using the image captured by any one of a plurality of cameras, the image corresponding to the image of the characteristic area captured by the other camera is detected and the focus of the subject can be adjusted based on the detection result. As a result, it is possible to simply and quickly focus a plurality of cameras.

In addition, since one of the cameras receives information representing a relative distance from the subject and posture information from the other camera, and the framing computation is executed based on such information and the posture information of itself, it is possible to compute the movement amount (adjustment amount) necessary for framing. Further, since a user is prompted to move the picture direction by the computed movement amount (adjustment amount) being displayed, or the shot posture is adjusted by controlling the camera platform based on the computed movement amount (adjustment amount), it is possible to simply and quickly adjust the framing between a plurality of cameras such that the picture directions of a plurality of cameras are directed at the same subject.

Hereinbefore, while embodiments of the present invention have been described with reference to the accompanying drawings, a detailed configuration is not particularly limited to the aforementioned embodiment, and various modifications or changes may be made without departing from the spirit of the present invention. For example, when a 3-D image or a panorama image of the subject is created, one of the cameras may execute the framing computation in order to capture an image which is to be used in cooperation with the image of the subject captured by the other camera.

According to the present invention, from the image of a first imaging area captured by one of a plurality of imaging apparatuses, an image corresponding to the image of the characteristic area captured by the other imaging apparatus is detected. Focus of the subject is adjusted based on the detection result thereof. As a result, it is possible to simply and quickly adjust focus between a plurality of imaging apparatuses.

What is claimed is:

1. An imaging apparatus comprising:
a receiving unit that receives information representing a first focal length from a terminal which produces an image of a first imaging area by capturing an image of a subject at the first focal length;
an imaging unit that produces an image of a second imaging area by capturing an image of the subject at a second focal length;
an extraction unit that extracts a characteristic area of the subject from the image of the second imaging area based on information representing the first focal length and information representing the second focal length; and
a transmitting unit that transmits information regarding the image of the characteristic area to the terminal.

2. The imaging apparatus according to claim 1, wherein the extraction unit further extracts characteristics of the subject from an image of the characteristic area, and the information regarding the image of the characteristic area includes the characteristics of the subject.

3. The imaging apparatus according to claim 1, wherein the transmitting unit further transmits information representing the second focal length to the terminal.

4. An imaging apparatus comprising:
a receiving unit that receives information representing the second focal length and information regarding an image of a characteristic area of a subject extracted from an image of a second imaging area from a terminal which produces the image of a second imaging area by capturing an image of the subject at a second focal length;
an imaging unit that produces an image of a first imaging area by capturing an image of the subject at a first focal length;
an area determination unit that determines a detection target area for detecting the image of the first imaging area corresponding to an image of the characteristic area based on information regarding the image of the characteristic area, information representing the first focal length, and information representing the second focal length;
a detection unit that detects the image of the first imaging area corresponding to the image of the characteristic area based on information regarding the image of the characteristic area and an image of the detection target area within the first imaging area; and
a control unit that adjusts focus of the subject based on a result of the detection.

5. The imaging apparatus according to claim 4, wherein the receiving unit further receives relative relationship information regarding a relative positional relationship between the terminal and the subject when the terminal captures an image of the subject at the second focal length and information representing a second imaging posture when the terminal captures an image of the subject at a second focal length, and
the control unit further executes a framing computation based on the relative relationship information, information representing the second imaging posture, and information representing a first imaging posture when the imaging apparatus captures an image of the subject at the first focal length.

6. The imaging apparatus according to claim 5, further comprising an adjustment unit that adjusts the first imaging posture based on a result of the framing computation.

7. The imaging apparatus according to claim 5, further comprising a display unit that displays a result of the framing computation.

8. The imaging apparatus according to claim 5, wherein the control unit executes the framing computation for capturing an image used together with an image obtained from the terminal by imaging the subject when a 3-D image or a panorama image of the subject is produced.

9. The imaging apparatus according to claim 5, further comprising a transmitting unit that transmits the information representing the first focal length to the terminal.

10. An imaging method comprising the steps of:
receiving information representing a first focal length of a subject from a terminal which produces an image of a first imaging area by capturing an image of the subject at the first focal length;
producing an image of a second imaging area by capturing an image of the subject at a second focal length and extracting a characteristic area of the subject from an image of the second imaging area based on information representing the first focal length and information representing the second focal length; and
transmitting information regarding the image of the characteristic area to the terminal.

11. An imaging method comprising the steps of:
receiving information representing a second focal length and information regarding an image of a characteristic area of a subject extracted from an image of a second imaging area from a terminal which produces an image of the second imaging area by capturing an image of the subject at the second focal length;

producing an image of a first imaging area by capturing an image of the subject at a first focal length;

determining a detection target area for detecting the image of the first imaging area corresponding to the image of the characteristic area based on the information regarding the image of the characteristic area, information representing the first focal length, and information representing the second focal length;

detecting the image of the first imaging area corresponding to the image of the characteristic area based on information regarding the image of the characteristic area and an image of the detection target area within the first imaging area; and adjusting focus of the subject based on a result of the detection.

12. An imaging system comprising a first imaging apparatus that produces an image of a first imaging area by capturing an image of a subject at a first focal length and a second imaging apparatus that produces an image of a second imaging area by capturing an image of the subject at a second focal length, wherein the first imaging apparatus includes:

a first receiving unit that receives information regarding an image of a characteristic area of the subject extracted from the image of the second imaging area and information representing the second focal length from the second imaging apparatus;

a first imaging unit that produces the image of the first imaging area by capturing an image of the subject at the first focal length;

a first transmitting unit that transmits information representing the first focal length to the second imaging apparatus;

an area determination unit that determines a detection target area for detecting the image of the first imaging area corresponding to the image of the characteristic area based on information regarding the image of the characteristic area, information representing the first focal length, and information representing the second focal length;

a detection unit that detects the image of the first imaging area corresponding to the image of the characteristic area based on information regarding the image of the characteristic area and an image of the detection target area within the first imaging area; and a control unit that adjusts focus of the subject based on a result of the detection, and the second imaging apparatus includes:

a second receiving unit that receives information representing the first focal length from the first imaging apparatus;

a second imaging unit that produces an image of the second imaging area by capturing an image of the subject at the second focal length;

an extraction unit that extracts the characteristic area of the subject from the image of the second imaging area based on information representing the first focal length and information representing the second focal length; and a second transmitting unit that transmits information regarding the image of the characteristic area and information representing the second focal length to the first imaging apparatus.

* * * * *